(12) United States Patent
Paillier et al.

(10) Patent No.: US 12,418,397 B2
(45) Date of Patent: Sep. 16, 2025

(54) CRYPTOGRAPHIC METHOD, SYSTEMS AND SERVICES FOR EVALUATING UNIVARIATE OR MULTIVARIATE REAL-VALUED FUNCTIONS ON ENCRYPTED DATA

(71) Applicant: ZAMA SAS, Paris (FR)

(72) Inventors: Pascal Gilbert Yves Paillier, Paris (FR); Marc Joye, Saint Zacharie (FR)

(73) Assignee: ZAMA SAS, Paris (FR)

( * ) Notice: Subject to any disclaimer, the term of this patent is extended or adjusted under 35 U.S.C. 154(b) by 87 days.

(21) Appl. No.: 17/924,577

(22) PCT Filed: May 14, 2021

(86) PCT No.: PCT/FR2021/000049
§ 371 (c)(1),
(2) Date: Nov. 10, 2022

(87) PCT Pub. No.: WO2021/229156
PCT Pub. Date: Nov. 18, 2021

(65) Prior Publication Data
US 2023/0291540 A1 Sep. 14, 2023

(30) Foreign Application Priority Data
May 14, 2020 (FR) ...................................... 2004772

(51) Int. Cl.
*H04L 9/00* (2022.01)
*H04L 9/06* (2006.01)
*H04L 9/30* (2006.01)

(52) U.S. Cl.
CPC ............ *H04L 9/008* (2013.01); *H04L 9/0618* (2013.01); *H04L 9/3093* (2013.01)

(58) Field of Classification Search
CPC ..... H04L 9/008; H04L 9/0618; H04L 9/3093; H04L 2209/16; H04L 2209/46
See application file for complete search history.

(56) References Cited

U.S. PATENT DOCUMENTS

| 6,293,139 | B1 | 9/2001 | Keller et al. |
| 7,162,032 | B2 * | 1/2007 | Brekne ................. H04L 9/3093 380/28 |
| 8,630,422 | B2 | 1/2014 | Gentry |
| 8,861,327 | B2 | 10/2014 | Prothero et al. |

(Continued)

FOREIGN PATENT DOCUMENTS

| CA | 3121012 A1 * | 6/2020 | ............. G06N 5/025 |
| CN | 108521326 | 9/2011 | |

(Continued)

OTHER PUBLICATIONS

Pinkus, Allan, *Approximating By Ridge Functions*, Surface Fitting and Multiresolution Methods, pp. 1-14 (1997).

(Continued)

*Primary Examiner* — John B King
(74) *Attorney, Agent, or Firm* — Nixon & Vanderhye, P.C.

(57) ABSTRACT

The invention relates to a cryptographic method and variants thereof based on homomorphic encryption enabling the evaluation of real-valued functions on encrypted data, in order to allow carrying out homomorphic processing on encrypted data more broadly and efficiently.

31 Claims, 3 Drawing Sheets

(56) References Cited

U.S. PATENT DOCUMENTS

Figure 1:
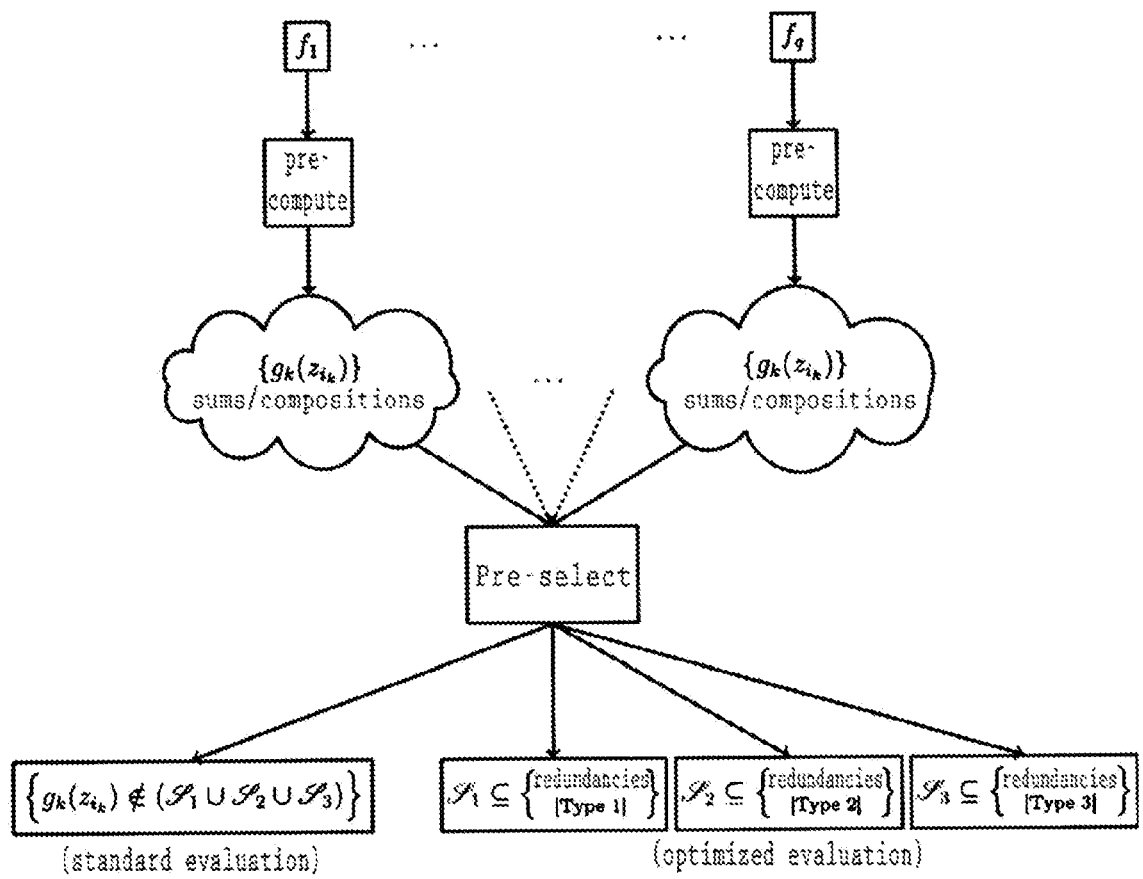

| | | | |
|---|---|---|---|
| 9,191,196 | B2 * | 11/2015 | Raykova ............... H04L 9/008 |
| 9,579,035 | B2 | 2/2017 | Sarkela |
| 2002/0027986 | A1 | 3/2002 | Brekne |
| 2012/0151205 | A1 * | 6/2012 | Raykova ............... H04L 9/008 |
| | | | 713/150 |
| 2013/0129090 | A1 * | 5/2013 | Kipnis ............... H04L 9/3093 |
| | | | 380/255 |
| 2013/0216044 | A1 | 8/2013 | Gentry et al. |
| 2015/0046708 | A1 | 2/2015 | Yasuda et al. |
| 2019/0007196 | A1 * | 1/2019 | Malluhi ............... H04L 9/008 |
| 2019/0013947 | A1 | 1/2019 | Rogers et al. |
| 2020/0335107 | A1 * | 10/2020 | Hahn ............... G06F 21/6245 |
| 2022/0028001 | A1 * | 1/2022 | Wachell ............ G06Q 10/0637 |
| 2022/0317672 | A1 | 10/2022 | Wang et al. |
| 2023/0188318 | A1 | 6/2023 | Paillier et al. |

FOREIGN PATENT DOCUMENTS

| | | | |
|---|---|---|---|
| CN | 104283669 | | 1/2015 |
| CN | 107181584 | | 9/2017 |
| CN | 109962778 | | 7/2019 |
| EP | 1475918 | A2 | 11/2004 |
| EP | 1068695 | B1 | 4/2010 |
| EP | 4150852 | B1 | 6/2024 |
| JP | 2021-83038 | | 5/2021 |
| JP | 2023-525159 | | 6/2023 |
| WO | WO-2016169346 | A1 * | 10/2016 ............... G09C 1/00 |

OTHER PUBLICATIONS

Brakerski, Zvika et al, (*Leveled*) *Fully Homomorphic Encryption Without Bootstrapping*, ITCS '12: Proceedings of the 3rd Innovations in Theoretical Computer Science Conference, Jan. 2012, pp. 309-325.

Broomhead, D.S. et al, *Multivariable Functional Interpolation and Adaptive Networks*, Complex Systems 2 (1988) 321-355.

Stehlé, Damien et al, *Efficient Public Key Encryption Based on Ideal Lattices*, Cryptology ePrint Archive, Paper 2009/285 (2009).

Bourse, Florian et al, *Fast Homomorphic Evaluation of Deep Discretized Neural Networks*, Cryptology ePrint Archive, LNCS 9020, pp. 733-751 (2017).

Chillotti et al, *Faster Fully Homomorphic Encryption: Bootstrapping in less than 0.1 Seconds*, Cryptology ePrint Archive, Paper 2016/870 (2016).

Ducas, Léo et al, *FHEW: Bootstrapping Homomorphic Encryption in less and a second*, Cryptology ePrint Archive, Paper 2014/816 (2014).

Friedman, Jerome H. et al, *Projection Pursuit Regression*, J. American Statistical Association, vol. 76, No, 376, Dec. 1981.

Van Dijk, Marten et al, *Fully Homomorphic Encryption over the Integers*, Cryptology ePrint Archive, Paper 2009/616 (2010).

Gentry, Craig, *Fully Homomorphic Encryption Using Ideal Lattices*, STOC '09: Proceedings of the forty-first annual ACM symposium on Theory of computing, May 2009, pp. 169-178.

Gentry, Craig et al, *Homomorphic Encryption from Learning with Errors: Conceptually-Simpler, Asymptotically-Faster, Attribute-Based*, Cryptology ePrint Archive, Paper 2013/340, Jun. 8, 2013.

Kolmogorov, A.N., *On the Representation of Continuous Functions of Several Variables as Superpositions of Continuous Functions of One Variable and Addition*, Dok. Akad. Nauk SSR, 114:5 (1957), pp. 953-956.

Logan, B.F. et al, *Optimal Reconstruction of a Function from its Projections*, Duke Mathematical Journal, vol. 42, No. 4, Dec. 1975.

Lyubashevsky, Vadim et al, *On Ideal Lattices and Learning with Errors over Rings*, Eurocrypt 2010, LNCS 6110, pp. 1-23 (2010).

Carpov, Sergiu et al, *New techniques for Multi-value Input Homomorphic Evaluation and Applications*, Cryptology ePrint Archive, Paper 2018/622, Jun. 22, 2018.

Braun, Jürgen et al, *On a constructive proof of Kolmogorov's superposition theorem*, Constructive Approximation 30, 653-675 (2009).

Sprecher, David A., *On the Structure of Continuous Functions of Several Variables*, Transactions of the American Mathematical Society, vol. 115, pp. 340-355, Mar. 1965.

Regev, Oded, *On Lattices, Learning with Errors, Random Linear Codes, and Cryptography*, Journal of the ACM, vol. 56, Issue 6, Article No. 34, pp. 1-40, Sep. 8, 2005.

Rothblum, Ron, *Homomorphic Encryption: from Private-Key to Public-Key*, Electronic Colloquium on Computational Complexity, Report No. 146 (2010).

Boura, Christina et al, *Simulating Homomorphic Evaluation of Deep Learning Predictions*, Cryptology ePrint Archive, Paper 2019/591, May 30, 2019.

Sprecher, David A., *A Numerical Implementation of Kolmogorov's Superpositions*, Neural Networks, vol. 9, No. 5, pp. 795-772 (1996).

Sprecher, David A., *A Numerical Implementation of Kolmogorov's Superpositions II*, Neural Networks, vol. 10, No. 3, pp. 447-457 (1997).

Chillotti et al, *TFHE: Fast Fully Homomorphic Encryption over the Torus*, Cryptology ePrint Archive, Paper 2018/421 (2018).

Leni, Pierre-Emmanuel et al, *Kolmogorov Superposition Theorem and its application to multivariate function decompositions and image representation*, IEEE International Conference: Signal Image Technology and Internet Based Systems, Nov. 2008, Bali, Indonesia, pp. 344-351.

International Search Report for PCT/FR2021/000049, mailed Sep. 20, 2021, 4 pages.

Written Opinion of the ISA for PCT/FR2021/000049, mailed Sep. 20, 2021, 6 pages.

Gentry, "Fully homomorphic encryption using ideal lattices" In: 41stAnnual ACM Symposium on Theory of Computing, ACM Press, pp. 169-178, 2009.

Sprecher, "On the structure of continuous functions of several variables" *Transactions of the American Mathematical Society*, vol. 115, 1965, pp. 340-355.

PINKUS "Approximating by ridge functions", Surface Fitting and Multiresolution Methods, Vanderbilt University Press, pp. 279-292, 1997.

Bourse et al., "Fast homomorphic evaluation of deep discretized neural networks" Advances in Cryptology—CRYPTO 2018, Part III, Springer , pp. 483-512, vol. 10993, 2018.

Hiroki Okada et al, "TFHE Integer-wise Bootstrapping Integer-wise General Bootstrapping on the TFHE", The Institute of Electronics, Information and Communication Engineers, 2020 Symposium on Cryptography and Information Security, Kochi, Japan, Jan. 28-31, 2020.

Notice of Reasons for Rejection, JP Application No. 2022-569449, Dec. 17, 2024.

Dowerah et al., "A Somewhat Homomorphic Encryption Scheme Based on Multivariate Polynomial Evaluation", Department of Electronics and Electrical Engineering, Indian Institute of Techology Guwahati, pp. 1-6.

Cui et al., "Survey on Application of Homomorphic Encryption in Encrypted Machine Learning", Collete of Computer, National University of Defense Technology, Changsha 410073, China) Computer Science, vol. 45, No. 4, Apr. 2018, pp. 46-52.

Boura, Christina et al.; Chimera: a unified framework for B/FV, TFHE and HEAAN fully homomorphic encryption and predictions for deep learning (2018).

Cillotti, Ilaria, Vers l'efficacitéet la sécuritédu chiffrement homomorphe et du cloud computing, these de doctored de l'UniversitéParis-Saclay, May 17, 2018.

Nicolas Gama, DPPH/chimera-iDash2018/fhe/GitHub, https://github.com/DPPH/chimeraiDash2018/tree/356a956f77d9c60fd86d1cf726037c58a3e3396, Sep 7, 2018.

Nicholas Gama, Chimeria-iDas2018/fhe/cloud-program.cpp at https://github.com/DPPH/chimeraiDash2018/tree/356a956f77d9c60fd86d1cf726037c58a3e3394g/fhe Sep. 7, 2018.

Nicholas Gama, Chimeria-iDas2018/fhe/manalgo.cpp at https://github.com/DPPH/chimeraiDash2018/tree/356a956f77d9c60fd86d1cf726037c58a3e3394g/fhe, Sep. 7, 2018.

(56) References Cited

OTHER PUBLICATIONS

Nicholas Gama, Chimeria-iDas2018/fhe/TRLwe.cpp at https://github.com/DPPH/chimeraiDash2018/tree/356a956f77d9c60fd86d1cf726037c58a3e3394g/fhe, Sep. 7, 2018.
Nicholas Gama, Chimeria-iDas2018/fhe/arithmetic.cpp at https://github.com/DPPH/chimeraiDash2018/tree/356a956f77d9c60fd86d1cf726037c58a3e3394g/fhe, Sep. 7, 2018.
Nicholas Gama, Chimeria-iDas2018/fhe/TRGSW.cpp at https://github.com/DPPH/chimeraiDash2018/tree/356a956f77d9c60fd86d1cf726037c58a3e3394g/fhe, Sep. 7, 2018.
Nicholas Gama, Chimeria-iDas2018/fhe/section2_params.h.cpp at https://github.com/DPPH/chimeraiDash2018/tree/356a956f77d9c60fd86d1cf726037c58a3e3394g/fhe, Sep. 7, 2018.
Crawford, Jack L.G et al.; Doing Real Work with FHE: the Case of Logistic Regression, Feb. 19, 2018.
Carpov, Sergiu et al, New techniques for multi-value input homomorphic evaluation and applications, Cryptographers' Track at the RSA Conference, Cham: Springer International Publishing, 2019.
Ostrand, Phillip A., Dimension of metric spaces and Hilbert's Problem, communication by R.P. Boas, Mar. 10, 1965.

\* cited by examiner

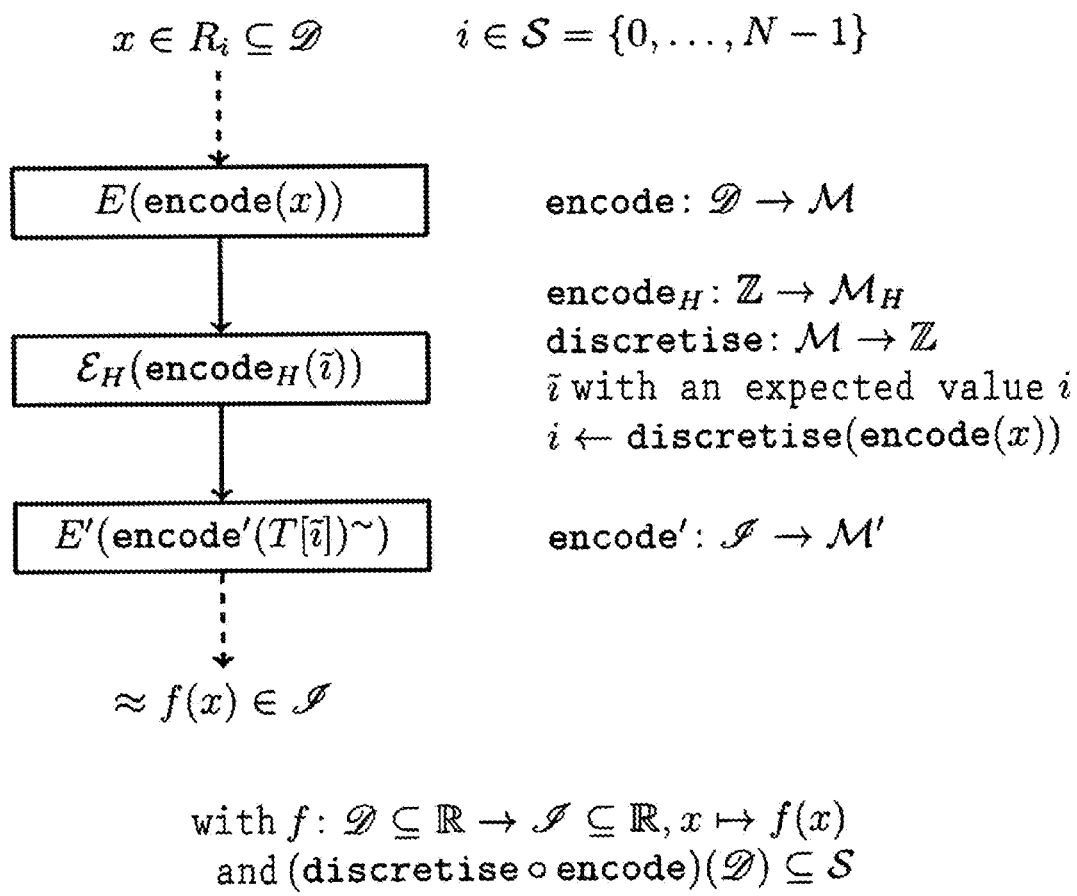

CRYPTOGRAPHIC METHOD, SYSTEMS AND SERVICES FOR EVALUATING UNIVARIATE OR MULTIVARIATE REAL-VALUED FUNCTIONS ON ENCRYPTED DATA

CROSS-REFERENCE TO RELATED APPLICATIONS

This application is the U.S. national phase of International Application No. PCT/FR2021/000049 filed May 14, 2021, which designated the U.S. and claims priority to FR 2004772 filed May 14, 2020, the entire contents of each of which are hereby incorporated by reference.

FIELD OF THE INVENTION

The invention relates to improving the homomorphic evaluation of one or more function(s) applied to data that are encrypted beforehand. This technical field, based on recent cryptology works, potentially includes numerous applications in all activity sectors where confidentiality constraints exist (such as, not exclusively, those of privacy protection, those of business secrets, or those of medical data).

More particularly, the invention relates to methods for enabling the automated completion, by one or more specifically programmed computer system(s), of the calculations necessary for the homomorphic evaluation of one or more function(s). Hence, it is necessary to take into account the limited storage and computation time capacities, or still—in the case of a cloud computing type remote processing of the—transmission capacities that can be known by the information processing systems that should perform this type of evaluation.

As will be described hereinbelow, the development of homomorphic encryption methods has hitherto been greatly hindered by such technical constraints related to the processing capacities by computers and inherent to most of the schemes proposed by the literature, in particular in terms of machine resources to be implemented and computation times to be supported in order to carry out the different computation phases.

PRIOR ART

A fully homomorphic encryption scheme (Fully Homomorphic encryption, abbreviated as FHE) enables any participant to publicly transform a set of ciphertexts (corresponding to cleartexts $x_1, \ldots, x_p$) into a ciphertext corresponding to a given function $f(x_1, \ldots, x_p)$ of the cleartexts, without this participant having access to the cleartexts themselves. It is well known that such a scheme can be used to construct protocols complying with private life (privacy preserving): a user can store encrypted data on a server, and authorise a third-party to perform operations on the encrypted data, without having to reveal the data themselves to the server.

The first fully homomorphic encryption scheme has been proposed only in 2009 by Gentry (who has obtained the U.S. Pat. No. 8,630,422B2 at 2014 on the basis of a first filing of 2009); also cf. [Craig Gentry, "Fully homomorphic encryption using ideal lattices", in 41st Annual ACM Symposium on Theory of Computing, pages 169-178, ACM Press, 2009]. Gentry's construction is not used nowadays, but one of the functionalities that it has introduced, "bootstrapping", and in particular one of its implementations, is widely used in the schemes that have been proposed subsequently. Bootstrapping is a technique used to reduce the noise of the ciphertexts: indeed, in all known FHE schemes, the ciphertexts contain a small amount of random noise, necessary for security reasons. When operations are carried out on noisy ciphertexts, the noise increases. After having evaluated a given number of operations, this noise becomes too high and may jeopardise the result of the calculations. Consequently, bootstrapping is fundamental for the construction of homomorphic encryption schemes, but this technique is very expensive, whether in terms of used memory or computation time.

The works that have followed Gentry's publication have aimed to provide new schemes and to improve bootstrapping in order to make the homomorphic encryption feasible in practice. The most famous constructions are DGHV [Marten van Dijk, Craig Gentry, shai Halevi and Vinod Vaikuntanathan, "Fully homomorphic encryption over the integers", in *Advances in Cryptology—EUROCRYPT* 2010, volume 6110 of *Lecture Notes in Computer Science*, pp. 24-43, springer, 2010], BGV [Zvika Brakerski, Craig Gentry, and Vinod Vaikuntanathan, "(Levelled) fully homomorphic encryption without bootstrapping", in *ITCS* 2012; 3rd *Innovations in Theoretical Computer Science*, pages 309-325, ACM Press, 2012], GSW [Craig Gentry, Eds, Amit Sahai and Brent Waters, "Homomorphic encryption from learning with errors: Conceptually simpler, asymptotically faster, Attribute-based", in *Advances in Cryptology-CRYPTO* 2013, *Part I*, volume 8042 of *Lecture Notes in Computer Science*, pp. 75-92, springer, 2013] and variants thereof. While the execution of a bootstrapping in the first Gentry's scheme has not been feasible in practice (one lifetime would not have been sufficient to complete the calculations), the constructions proposed successively have made this operation feasible, although not very practical (each bootstrapping lasting a few minutes). A faster bootstrapping, executed on a GSW type scheme, has been proposed in 2015 by Ducas and Micciancio [Leo Ducas and Daniele Micciancio, "FHEW: Bootstrapping homomorphic encryption in less than a second", in *Advances in Cryptology—EUROCRYPT* 2015, *Part I*, Volume 9056 of *Lecture Notes in Computer Science*, pages 617-640, springer, 2015]: the bootstrapping operation is carried out in a little more than a half second. In 2016, Chillotti, Gama, Georgiava and Izabachene proposed a new variant of the FHE scheme, called TFHE [Ilaria Chillotti, Nicolas Gama, Mariya Georgieva and Malika Izabachene, "Faster fully homomorphic encryption: Bootstrapping in less than 0.1 seconds", in *Advances in Cryptology—ASIA-CRYPT* 2016, *Part I*, volume 10031 of *Lecture Notes in Computer Science*, pages 3-33, Springer, 2016]. Their bootstrapping technique has served as a basis in subsequent works. Mention may be made to the work of Bourse et al. [Florian Bourse, Micheles Minelli, Matthias Minihold and Pascal Paillier, "Fast homomorphic evaluation of deep discretised neural networks", in *Advances in Cryptology—CRYPTO* 2018, *Part III*, volume 10993 of *Lecture Notes in Computer Science*, pages 483-512, springer, 2018], Carpov et al. [Sergiu Carpov, Malika Izabachene and Victor Mollimard, "New techniques for multi-value input homomorphic evaluation and applications", in *Topics in Cryptology—CT-RSA* 2019, volume 11405 of *Lecture Notes in Computer Science*, pages 106-126, springer, 2019], Boura et al. [Christina Boura, Nicolas Gama, Mariya Georgieva and Dimitar Jetchev, "Simulating homomorphic evaluation of deep learning predictions", in *Cyber Security Cryptography and Machine Learning* (CSCML 2019), volume 11527 of *Lecture Notes in Computer Science*, pages 212-230, springer, 2019] and Chillotti et al. [Ilaria Chillotti, Nicolas Gama, Mariya Georgieva and Malika Izabachène, "TFHE: Fast fully homomorphic encryption over the torus", *Journal of Cryptology*, 31(1), pp. 34-91, 2020]. The TFHE performances are remarkable. They have contributed to the progress of research in the field and in making the homomorphic encryption more practical. The proposed new techniques have made it possible to calculate a bootstrapping in a few milliseconds.

Technical Problem

Despite the accomplished progress, the known calculation procedures allowing publicly transforming a set of ciphertexts (corresponding to cleartexts $x_1, \ldots, x_p$) into a ciphertext corresponding to a given function $f(x_1, \ldots, x_p)$ of the cleartexts, remain for the time being limited to some instances or remain impractical. Indeed, the main current generic means consists in representing this function in the form of a Boolean circuit—composed of logic gates of the AND, NOT, OR or XOR type, then in homomorphically evaluating this circuit, with as input the ciphertexts of the bits representing the inputs (in clear) of the function $f$. A measurement of the complexity of the Boolean circuit is its multiplicative depth, defined as the maximum number of successive AND gates that should be calculated to obtain the result of the calculation. For the noise to remain controlled during this calculation, it is necessary to regularly perform bootstrapping operations during the progress thereof. As indicated hereinabove, even with the most recent techniques, these bootstrapping operations involve complex calculations and make the entire calculation even slower as the multiplicative depth is great. This approach is viable only for functions operating on binary inputs and having a simple Boolean circuit.

In general, the function to be evaluated takes as input one or more real-valued variable(s) $x_1, \ldots, x_p$. There may even be several functions $f_1, \ldots, f_q$ to be evaluated on a set of real-valued variables. Hence, there is a major technical and economic interest in finding a method allowing carrying out rapidly and without mobilising excessively large computing means, the aforementioned operation of publicly transforming a set of ciphertexts (corresponding to cleartexts $x_1, \ldots, x_p$) into a set of ciphertexts corresponding to a plurality of real-valued functions $f_1, \ldots, f_q$ of the cleartexts. Indeed, to date, the theoretical advances made by Gentry in 2009 have not known actual concretizations, due to the absence of effective solutions for this technical problem. It is to this problem that the present invention provides a response.

Subject of the Invention

The present application describes a set of methods intended to be executed in a digital form by at least one information processing system specifically programmed to effectively and publicly transform a set of ciphertexts (corresponding to cleartexts $x_1, \ldots, x_p$) into a set of ciphertexts corresponding to a plurality of functions $f_1, \ldots, f_q$ of the cleartexts. This new method transforms the multivariate functions $f_1, \ldots, f_q$ into a form combining sums and compositions of multivariate functions. Preferably, the intermediate values resulting from the transformation of the functions $f_1, \ldots, f_q$ are reused in the evaluation. Finally, each of the univariate functions is preferably represented in the form of tables—and not according to the usual representation in the form of a Boolean circuit.

Remarkably, any multivariate function defined on reals and with a real value is supported. The entries undergo prior encoding in order to ensure compatibility with the native space of the messages of the underlying encryption algorithm. Decoding can also be applied at the output, after decryption, to the image of the considered function.

The technical effect of this invention is significant since the techniques that it implements, considered independently or in combination, will allow carrying out an evaluation of the results of a plurality of functions $f_1, \ldots, f_q$ applied to encrypted data while considerably reducing the complexity and the necessary computation times. As described hereinbelow, this lightening results in particular from the fact (i) that the multivariate functions to be evaluated are transformed into univariate functions rather than working directly on functions of several variables, (ii) that these functions can be decomposed so as to share results of intermediate calculations rather than perform separate evaluations, and (iii) that the resulting univariate functions are represented by tables rather than by a Boolean circuit.

When a function $f$ has several variables $x_1, \ldots, x_p$, a method according to the invention is to transform the function $f$ as a combination of sums and compositions of univariate functions. It should be noted that these two operations, the sum and the composition of univariate functions, allow expressing affine transformations or else linear combinations. By analogy with neural networks, the expression "network of univariate functions" is used to refer to the representation upon completion of the transformation from multivariate to univariate combining sums and compositions of univariate functions, which network will be homomorphically evaluated on a plurality of encrypted values. Said transformation may be exact or approximate; nonetheless, it should be noted that an exact transformation is an error-free approximate transformation. In practice, the networks thus obtained have the characteristic of having a low depth in comparison with the Boolean circuits implementing the same functionality. This new representation of the function $f$ is then used to evaluate it on the encrypted inputs E(encode $(x_1)), \ldots,$ E(encode($x_p$)) where E refers to an encryption algorithm and encode an encoding function, which will allow ending up in calculations of the type E(encode($g_j(z_k)$)) for some univariate functions $g_j$, starting from an input of the type E(encode($z_k$)) where $z_k$ is an intermediate result. These calculations exploit the homomorphic property of the encryption algorithm.

When the same network of univariate functions is reused several times, it is interesting not to have to re-do all the calculation phases. Thus, according to the invention, a first step consists in pre-calculating said network of univariate functions; it is then homomorphically evaluated on data encrypted in a subsequent step.

The fact that any continuous multivariate function can be written as sums and compositions of univariate functions has been demonstrated by Kolmogorov in 1957, [Arey N. Kolmogorov, "On the representation of continuous functions of dynamic variables by superposition of continuous functions of one variable and addition", *Dokl. Akad. Nauk SSSR*, 114, pp. 953-956, 1957].

This result has remained theoretical for a long time, but algorithmic versions have been found, in particular by Sprecher, who proposed an algorithm in which he explicitly describes the method for constructing the univariate functions [David A. Sprecher, "On the structure of continuous functions of several variables", *Transactions of the American Mathematical Society*, 115, pp. 340-355, 1965]. A detailed description thereof can be found for example in the article [Pierre-Emmanuel Leni, Yohan Fougerolle and Frederic Truchetet, "Komogorov superposition theory and its application to the decomposition of multivariate functions", in *MajecSTIC '08*, 29-31 Oct. 2008, Marseille, France, 2008]. Moreover, it should be noticed that the assumption of continuity of the function to be decomposed can be relaxed by considering an approximation of the latter.

Another possible approach consists in approximating the multivariate function by a sum of particular multivariate functions called ridge functions [B. F. Logan and L. A. Shepp, "Optimal reconstruction of a function from its projections", *Duke Mathematical Journal*, 42(4), pp. 645-659, 1975] according to the English terminology. A ridge function of a real-valued variable vector $x=(x_1, \ldots, x_p)$ is a function applied to the scalar product of this variable vector with a real parameter vector $a=(a_1, \ldots, a_p)$, i.e. a function of the type $g_a(x)=g(a \cdot x)$ where g is univariate. As noted hereinabove, a scalar product or equivalently a linear combination is a particular case of a combination of sums and compositions of univariate functions; the decomposition of a multivariate function in the form of a sum of ridge functions forms an embodiment of a transformation from multivariate into univariate according to the invention. It is known that any multivariate function can be approximated with as great accuracy as is desired by a sum of ridge functions if it is possible to increase the number thereof [Allan Pinkus, "Approximating by ridge functions", in A. Le Mehaute, C. Rabut and L. L. Schumaker (Eds.), *Surface Fitting and Multiresolution Methods*, pages 279-292, Vanderbilt University Press, 1997]. These mathematical results have given rise to a statistical optimization method known under the name of projection pursuit [Jerome H. Friedman and Werner Stuetzle, "Projection pursuit regression", *Journal of the American Statistical Association*, 76(376), pp. 817-823, 1981].

The use of so-called radial functions of the $g_a(x)=g(\|x-a\|)$ type instead of the ridge functions is also a possibility [D. S. Broomhead and David Lowe, "Multivariable functional interpolation and adaptive networks", *Complex Systems*, 2, pp. 321-355, 1988], and other families of basic functions can be used with a similar approximation quality (convergence rate). In some cases, formal decomposition is possible, without going through Kolmogorov theorem or one of its algorithmic versions (such as that of Sprecher), or through ridge, radial functions, or variants thereof. For example, the function $g(z_1, z_2)=\max(z_1, z_2)$ (which serves in particular as the so-called "max pooling" layers used by neural networks) can thus be decomposed: $\max(z_1, z_2)=z_2+(z_1-z_2)^+$ where $z \mapsto z^+$ corresponds to the univariate function $z \mapsto \max(z, 0)$.

Given the data of the functions $f_1, \ldots, f_q$, when each of these is represented by a network of univariate functions, which is then intended to be homomorphically evaluated on encrypted data, this evaluation can be performed in an optimised manner when all or part of one or more of these univariate functions is reused. Thus, for each of the redundancies observed in the set of univariate functions of said network, some of the procedures of homomorphic evaluation of univariate function on an encrypted value will have to be performed only once. Knowing that this function homomorphic evaluation is typically done on the fly and greatly burdens the processing speed, sharing the intermediate values gives rise to very significant performance gains.

Three types of possible optimizations are considered:

Same Function, Same Argument

With an equal number of univariate functions, this optimization consists in preferring the networks of univariate functions repeating a maximum of times the same univariate functions applied to the same arguments. Indeed, whenever the univariate function and the input on which it is evaluated are the same, the homomorphic evaluation of this univariate function on this input does not need to be recalculated.

Different Function, Same Argument

This optimization applies when the homomorphic evaluation of two or more univariate functions on the same input can be done essentially at the cost of a single homomorphic evaluation, an embodiment allowing sharing a large part of the computation. A similar situation has been considered in the aforementioned article of CT-RSA 2019 under the name of multi-output version. An example of such an embodiment is presented in the section "Detailed description of the invention". In the multivariate case, this situation appears for example in the decomposition of several multivariate functions in the form of a sum of ridge functions or radial functions when the coefficients $(a_{jk})$ of the decompositions are fixed.

Same Function, Arguments Differing by a Non-Zero Additive Constant

Another situation that allows accelerating the calculations is when the same univariate function is evaluated on arguments whose difference is known. This happens for example when a Kolmogorov-type decomposition is used, in particular the approximate algorithmic version of Sprecher. In this situation, the decomposition involves so-called "internal" univariate functions; cf. in particular the application to the internal function $\Psi$ in the "Detailed description of the invention" section. The extra cost in the latter case is minimal.

These optimizations apply when several functions $f_1, \ldots, f_q$ should be evaluated, but they also apply in the case of a single function to be evaluated (q=1). In all cases, it is interesting to produce networks of univariate functions having not only a reduced number of univariate functions but also to prefer different functions yet on the same arguments or the same functions on arguments differing by an additive constant, in order to reduce the cost of evaluation thereof. This nature is specific to networks of univariate functions when these are homomorphically evaluated on encrypted inputs.

Whether the functions subjected to the evaluation according to the invention are multivariate and have formed undergone the first steps presented hereinabove, or it is intended to process the natively univariate functions, the invention provides for carrying out the homomorphic evaluation of these univariate functions, and in an advantageous variant to use for this purpose a representation in the form of tables.

The homomorphic evaluation of a univariate function, or more generally of a combination of univariate functions, is based on homomorphic encryption schemes.

Introduced by Regev in 2005 [Oded Regev, "On lattices, learning with errors, random linear codes, and cryptography", in 37*th Annual ACM Symposium on Theory of Computing*, pages 84-93, ACM Press, 2005], the LWE (standing for Learning With Errors) problem enables the construction of homomorphic encryption schemes on numerous algebraic structures. Usually, an encryption scheme includes an encryption algorithm $\varepsilon$ and a decryption algorithm $\mathcal{D}$ such that if $c=\varepsilon(\mu)$ is the encryption of a cleartext $\mu$ then $\mathcal{D}(c)$ returns the cleartext $\mu$. The encryption algorithms derived from the LWE problem and from its variants have the particularity of introducing noise in the ciphertexts. This is called native space of cleartexts to indicate the space of cleartexts on which the encryption algorithm is defined and for which the decryption of a ciphertext results in the initial cleartext, with the consideration of some noise. It should be recalled that for an encryption algorithm $\mathcal{E}$ having $\mathcal{M}$ as a native space of cleartexts, an encoding function encode is a function that brings an element of an arbitrary set in the set $\mathcal{M}$ or in a subset thereof preferably this function is injective.

Applied to the torus $\mathbb{T} = \mathbb{R}/\mathbb{Z}$ of reals modulo 1, as detailed in the aforementioned article of Chillotti et al. (ASIACRYPT 2016), such a scheme is defined as follows. For a positive integer n, the encryption key is a vector $(s_1, \ldots, s_n)$ of $\{0,1\}n$; the native space of the cleartexts is $\mathcal{M} = \mathbb{T}$. The LWE ciphertext of an element μ of the torus is the vector $c=(a_1, \ldots, a_n, b)$ of $\mathbb{T}^{n+1}$ where, for $1 \leq j \leq n, a_j$ is a random element of $\mathbb{T}$ and where $$b = \sum_{j=1}^{n} s_j \cdot a_j + \mu + e$$

(mod 1) with e a low noise according to a random error distribution over $\mathbb{R}$ centred on 0. Starting from the ciphertext $c=(a_1, \ldots, a_n, b)$, the knowledge of the key $(s_1, \ldots, s_n)$ allows finding $$\mu + e = b - \sum_{j=1}^{n} s_j \cdot a_j$$

(mod 1) as an element of $\mathbb{T}$. It should be recalled that two elements of the torus can be added but their internal product is not defined. The notation "·" indicates the external product between an integer and an element of the torus.

In the same article, the authors also describe a scheme based on the $\mathbb{Z}_N[X]$-module $\mathbb{T}_N[X] = \mathbb{R}N[X]/\mathbb{Z}_N[X]$ where $\mathbb{R}_N[X]$ and $\mathbb{Z}_N[X]$ are respectively the polynomial $\mathbb{R}_N\mathbb{R}[X]/(X^N+1)$ and $\mathbb{Z}[X] = \mathbb{Z}[X]/X^N+1)$. For strictly positive integers N and k, the encryption key is a vector $(s_1, \ldots, s_k)$ of $\mathbb{B}_N[X]^k$ with $\mathbb{B}_N[X] = \mathbb{B}[X]/(X^N+1)$ where $\mathbb{B} = \{0,1\}$ the native space of cleartexts is $\mathcal{M} = \mathbb{T}_N[X]$. The RLWE ciphertext of a polynomial μ of $\mathbb{T}_N[X]$ is the vector $c=(a_1, \ldots a_k, b)$ of $\mathbb{T}[X]^{k+1}$ where, for $1 \leq j \leq k$, $a_j$ is a random polynomial of $\mathbb{T}_N[X]$ and where $$b = \sum_{j=1}^{k} s_j \cdot a_j + \mu + e$$

(in $\mathbb{T}_N[X]$, i.e. modulo $(X^N+1,1)$) with e a low noise according to a random error distribution over $\mathbb{R}_N[X]$. Starting from the ciphertext $c=(a_1, \ldots, a_k, b)$, the knowledge of the key $(s_1, \ldots, s_k)$ allows finding $$\mu + e = b - \sum_{j=1}^{k} s_j \cdot a_j$$

(in $\mathbb{T}_N[X]$) as an element of $\mathbb{T}_N[X]$. The notation "·" herein indicates the external product on $\mathbb{T}_N[X]$. The "R" in RLWE refers to the word ring. These variants of the LWE problem have been suggested in [Damien Stehlé, Ron Steinfeld, Keisuke Tanaka and Keita Xagawa, "Efficient public key encryption based on ideal lattices", in *Advances in Cryptology—ASIACRYPT* 2009, volume 5912 of *Lecture Notes in Computer Science*, pages 617-635, Springer, 2009] and [Vadim Lyubashevsky, Chris Peikert and Oded Regev, "On ideal lattices and learning with errors over rings", in *Advances in Cryptology—EUROCRYPT* 2010, volume 6110 of *Lecture Notes in Computer Science*, pages 1-23, springer, 2010.]

Finally, this same article of ASIACRYPT 2016 introduces the external product between a RLWE-type ciphertext and a RGSW-type ciphertext (standing for Gentry-Sahai-Waters and 'R' refers to ring). It should be recalled that a RLWE-type encryption algorithm gives rise to a RGSW-type encryption algorithm. The notations of the previous paragraph are used. For an integer $\ell \geq 1$, Z denotes a matrix with $(k+1)\ell$ rows and k+1 columns in $\mathbb{T}_N[X]$ each row of which is a RLWE-type encryption of the polynomial 0. The RGSW ciphertext of a polynomial σ of $\mathbb{Z}_N[X]$ is then given by the matrix $C=Z+\sigma \cdot G$ where G is a so-called "gadget" matrix defined in $\mathbb{T}_N[X]$ (having$(k+1)\ell$ rows and k+1 columns) and given by $G=g^T \otimes I_{k+1} = \mathrm{diag}(g^T, \ldots, g^T)$ where $g=(1/B, \ldots, 1/B^\ell)$ and $I_{k+1}$ is the k+1-size identity matrix for a given base $B \geq 2$. To this widget is associated a transformation denoted $G^{-1}: \mathbb{T}_N[X]^{k+1} \to \mathbb{Z}_N[X]^{(k+1)\ell}$ such that for every vector (row) v of the polynomial in $\mathbb{T}_N[X]^{k+1}$, we have $G^{-1}(v) \cdot G \approx v$ and $G^{-1}(v)$ is small. The external product of the RGSW-type ciphertext C (of the polynomial σ∈ $\mathbb{Z}_N[X]$) by a RLWE-ty ciphertext c (of the polynomial μ∈ $\mathbb{T}_N[X]$), denoted $C \boxdot c$, is defined as $C \boxdot c = G^{-1}(c) \cdot C \in \mathbb{T}_N[X]^{k+1}$. The ciphertext thus obtained $C \boxdot c$ is a RLWE-type ciphertext of the polynomial $\sigma \cdot \mu \in \mathbb{T}_N[X]$. The proofs are given in the aforementioned article of ASIACRYPT 2016.

As shown, the preceding schemes are so-called symmetric or private-key encryption schemes. This is in no way a limitation because, as shown by Rothblum in [Ron Rothblum, "Homomorphic encryption: From private-key to public-key", in *Theory of Cryptography (TCC* 2011), volume 6597 of *Lecture Notes in Computer Science*, pages 219-234, springer, 2011], any additively homomorphic private-key encryption scheme can be converted into a public-key encryption scheme.

As recalled hereinabove, bootstrapping refers to a method allowing reducing any possible noise present in the ciphertexts. In his aforementioned STOC 2009 founding article, Gentry implements bootstrapping by the technique commonly referred to nowadays as "re-encryption", introduced thereby. Re-encryption consists in homomorphically evaluating a decryption algorithm in the encrypted domain. In the clear domain, the decryption algorithm takes as input a ciphertext C and a private key K, and returns the corresponding cleartext x. In the encrypted domain, with a homomorphic encryption algorithm E and an encoding function encode, the evaluation of said decryption algorithm takes as input a ciphertext of the encryption of C and a ciphertext of the encryption of K, E(encode(C)) and E(encode(K)), and therefore gives a new a ciphertext of the encryption of the same cleartext, E(encode(x)), under the encryption key of the algorithm E. Consequently, assuming that a ciphertext is given as the output of a homomorphic encryption algorithm E does not form a limitation because the re-encryption technique allows ending up in this case.

The homomorphic nature of the LWE-type encryption schemes and their variants allows manipulating the cleartexts by operating on the corresponding ciphertexts. The domain of definition of a univariate function $f$ to be evaluated is discretised into several intervals covering its domain of definition. Each interval is represented by a value $x_i$ as well as by the corresponding value of the function $f(x_i)$. Thus, the function $f$ is tabulated by a series of pairs in the form $(x_i, f(x_i))$. These pairs are actually used to homomorphically calculate a ciphertext of $f(x)$, or an approximate value, starting from a ciphertext of x, for an arbitrary value of x in the domain of definition of the function.

In the invention, at the core of this homomorphic calculation is a new generic technique, combining bootstrappings and encodings. Several embodiments are described in the "Detailed description of the invention" section.

The homomorphic assessment technique described in the aforementioned from ASIACRYPT 2016 article as well as those introduced in the aforementioned subsequent works do not enable the homomorphic evaluation of an arbitrary function, over an arbitrary domain of definition. First of all, these are strictly limited to univariate-type functions. The prior art has no known responses in the multivariate case. In addition, in the univariate case, the prior art assumes conditions on the input values or on the function to be evaluated. Among these limitations, note for example inputs limited to binary values (bits) or the required negacyclic nature of the function to be evaluated (verified for example by the "sign" function on the torus). No generic processing of the input or output values allowing ending up in these particular cases is described in the prior art for functions with an arbitrary real value.

Conversely, the implementation of the invention—while enabling the control of the noise at the output (boosting)—enables the homomorphic evaluation of functions with real-valued variables on inputs which are LWE-type ciphertexts of reals, regardless of the form of the functions or their domain of definition.

DETAILED DESCRIPTION OF THE INVENTION

The invention allows carrying out, digitally by at least one specifically programmed information processing system, the evaluation, on encrypted data, of one or more function(s) with one or more variables with real value $f_1, \ldots, f_q$, each of the functions taking as input a plurality of real-valued variables from among the real-valued variables $x_1, \ldots, x_p$. When at least one of said functions takes as input at least two variables, a method according to the invention schematically comprises three steps:

1. a so-called pre-calculation step consisting in transforming each of said multivariate functions into a network of univariate functions, composed of sums and compositions of univariate functions with real value,
2. a so-called pre-selection step consisting in identifying, in said pre-calculated univariate function networks, redundancies of different types and in selecting all or part of them,
3. a so-called step of homomorphic evaluation of each of the pre-calculated networks of univariate functions, in which the redundancies selected in the pre-selection step are evaluated in an optimised manner.

As regards the second step (pre-selection), the selection of all or part of the redundancies is primarily yet not exclusively guided by the objective of optimising the digital processing of the homomorphic evaluation, whether gain in terms of computation time or for availability reasons such as memory resources for storing intermediate computation values.

[FIG. 1] schematically replicates the first two steps as they are implemented according to the invention by a computer system programmed to this end.

Thus, in one of the embodiments of the invention, the evaluation of one or more multivariate functions with real value $f_1, \ldots, f_q$, each of the functions taking as input a plurality of real-valued variables from among the variables $x_1, \ldots, x_p$, and at least one of said functions taking as input at least two variables, taking as input the ciphertexts of the encryptions of each of the inputs $x_i$, $E(\text{encode}(x_i))$ with $1 \leq i \leq p$, and returning the plurality of ciphertexts of the encryptions of $f_1, \ldots, f_q$ applied to their respective inputs, where E is a homomorphic encryption algorithm and encode is an encoding function that associates to each of the reals $x_i$ an element of the native space of the cleartexts of E, may be characterised by:

1. a pre-calculation step consisting in transforming each of said multivariate functions into a network of univariate functions, composed of sums and compositions of univariate functions with real value,
2. a pre-selection step consisting in identifying in said networks of pre-calculated univariate functions the redundancies of one of the three types
   a. the same univariate functions applied to the same arguments,
   b. different univariate functions applied to the same arguments,
   c. the same univariate functions applied to arguments differing by a non-zero additive constant, and selecting all or part thereof,
3. a step of homomorphic evaluation of each of the pre-calculated networks of univariate functions, in which the redundancies selected in the pre-selection step are evaluated in an optimised manner.

As regards the pre-calculation step, an explicit version of Kolmogorov superposition theorem allows confirming that any continuous function $f: I^p \to \mathbb{R}$, , defined on the identity hypercube $I^p = [0,1]^p$ with the dimension p, can be written as sums and compositions of univariate continuous functions:

$$f(x_1, \ldots, x_p) = \sum_{k=0}^{2p} g_k(\xi(x_1 + ka, \ldots, x_p + ka))$$

with $$\xi(x_1 + ka, \ldots, x_p + ka) = \sum_{i=1}^{p} \lambda_i \Psi(x_i + ka)$$

where, with a given number p of variables, the $\lambda_i$ and a are constants, and $\Psi$ is a continuous function. In other words $$f(x_1, \ldots, x_p) = \sum_{k=0}^{2p} g_k\left(\sum_{i=1}^{p} \lambda_i \Psi(x_i + ka)\right).$$

Figure 2:
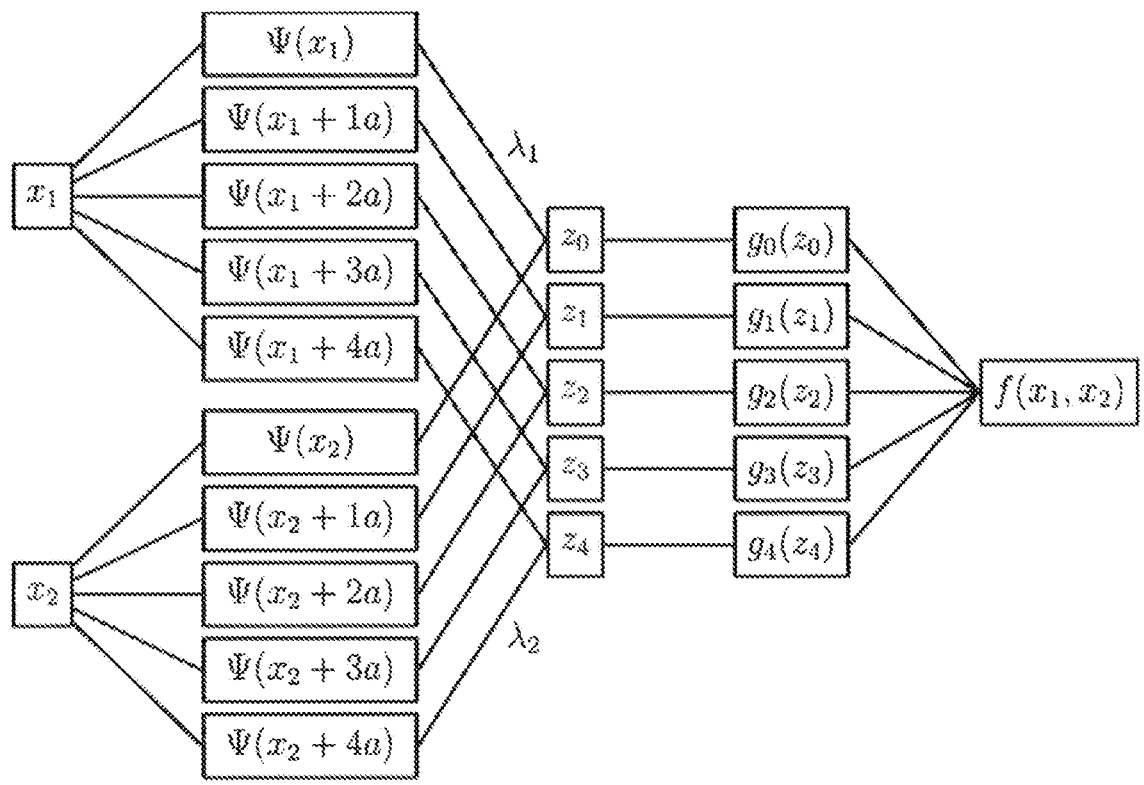

As example, [FIG. 2] illustrates the case p=2.

The functions $\Psi$ and $\xi$ are so-called "internal" and are independent of $f$ for a given arity. The function $\Psi$ associates, to any component $x_i$ of the real vector $(x_1, \ldots, x_p)$ of $I^p$, a value in [0,1]. The function $\xi$ allows associating, to each vector $(x_1, \ldots, x_p) \in I^p$ the numbers $$z_k = \sum_{i=1}^{p} \lambda_i \Psi(x_i + ka)$$

in the interval [0,1] which will then serve as arguments to the functions $g_k$ to rebuild the function $f$ by summing. It should be noted that the restriction of the domain of $f$ to the hypercube $I^p$ in Kolmogorov theorem is usually done in the scientific literature to simplify explanation thereof. However, it is obvious that this theorem naturally extends to any parallelepiped with a dimension p by homothety.

Sprecher proposed an algorithm for the determination of internal and external functions in [David A. Sprecher, "A numerical implementation of Kolmogorov's superpositions", *Neural Networks*, 9(5), pp. 765-772, 1996] and [David A. Sprecher, "A numerical implementation of Kolmogorov's superpositions II", *Neural Networks*, 10(3), pp. 447-457, 1997], respectively.

Instead of the function $\Psi$ initially defined by Sprecher to build ((which is discontinuous for some input values), it is possible to use the function $\Psi$ defined in [Jürgen Braun and Michael Griebel, "On a constructive proof of Kolmogorov's superposition theorem", *Constructive Approximation*, 30(3), pp. 653-675, 2007].

Once the internal functions $\Psi$ and $\xi$ have been fixed, it remains to determine the external functions $g_k$ (which depend on the function $f$). For this purpose, sprecher proposes the construction—for each k, $0 \le k \le 2p$—of r functions $g_k^r$ whose sum converges towards the external function $g_k$. At the end of $r^{th}$ step, the result of the approximation of $f$ is given in the following form:

$$f(x_1, \ldots, x_p) \approx \sum_{k=0}^{K} \sum_{j=1}^{r} g_k^j \circ \xi(x_1 + ka, \ldots, x_p + ka),$$

where K is a parameter such that $K \ge 2p$. Thus, the algorithm provides an approximate result with respect to that of Kolmogorov decomposition theorem. Indeed, by taking r quite great, and by assuming $$g_k = \sum_{j=1}^{r} g_k^j,$$

the next approximate representation for the function $f$ is obtained:

$$f(x_1, \ldots, x_p) \approx \sum_{k=0}^{K} g_k \circ \xi(x_1 + ka, \ldots, x_p + ka),$$

or still $$f(x_1, \ldots, x_p) \approx \sum_{k=0}^{K} g_k \left( \sum_{i=1}^{p} \lambda_i \Psi(x_i + ka) \right).$$

Thus, in one of the embodiments of the invention, the pre-calculation phase may be characterised in that for at least one function $f_j$ from among $f_1, \ldots, f_q$, the transformation of the pre-calculation step is an approximate transformation in the form $$f_j(x_{j_1}, \ldots, x_{j_t}) \approx \sum_{k=0}^{K} g_k \left( \sum_{i=1}^{t} \lambda_{j_i} \Psi(x_{j_i} + ka) \right)$$

with $t \le p$ and $j_1, \ldots, j_t \in \{1, \ldots, p\}$, and where $\Psi$ is a univariate function defined on reals and with real value, where the $\lambda_{j_i}$ are real constants and where the $g_k$ are univariate functions defined on reals and with real value, said functions $g_k$ being determined as a function of $f_j$, for a given parameter K.

Another technique for decomposing a multivariate function $f(x_1, \ldots, x_p)$ consists in approximating it with a sum of so-called ridge functions, according to the transform $$f(x_1, \ldots, x_p) \approx \sum_{k=0}^{K} g_k \left( \sum_{i=1}^{p} a_{i,k} x_i \right),$$

where the coefficients $a_{i,k}$ are real numbers and where the $g_k$ are univariate functions defined on the reals and with real value, said functions $g_k$ and said coefficients $a_{i,k}$ being determined as a function of $f_j$, for a given parameter K.

The decomposition is then approximate in the general case, and aims to identify the best approximation, or an approximation with enough quality. This approximation appears in the literature devoted to statistical optimisation as projection pursuit. As mentioned before, a noticeable result is that any function $f$ can be approximated in this manner with arbitrarily high accuracy. In practice, however, it is common that $f$ admits an exact decomposition, i.e. it is expressed analytically in the form of a sum of ridge functions for all or part of its inputs.

When a function $f_j$ takes as input a subset of t variables of $\{x_1, \ldots, x_p\}$ with $t \le p$, if these variables are denoted $x_{j_1}, \ldots, x_{j_t}$ with $j_1, \ldots, j_t \in \{1, \ldots, p\}$, then the previous ridge decomposition is written $$f_j(x_{j_1}, \ldots, x_{j_t}) \approx \sum_{k=0}^{K} g_k \left( \sum_{i=1}^{t} a_{i,k} x_{j_i} \right)$$

with $x = (x_{j_1}, \ldots, x_{j_t})$ and $a_k = (a_{1,k}, \ldots, a_{t,k})$, for functions $g_k$ and coefficients $a_{i,k}$ determined as a function of $f_j$, for a given parameter K.

Thus, in one of the embodiments of the invention, the pre-calculation phase may be characterised in that, for at least one function $f_j$ from among $f_1, \ldots, f_q$, the transformation of the pre-calculation step is an approximate transformation in the form $$f_j(x_{j_1}, \ldots, x_{j_t}) \approx \sum_{k=0}^{K} g_k \left( \sum_{i=1}^{t} a_{i,k} x_{j_i} \right)$$

with $t \le p$ and $j_1, \ldots, j_t \in \{1, \ldots, p\}$, and where the coefficients $a_{i,k}$ are real numbers and where the $g_k$ are univariate functions defined on the reals and with real value, said functions $g_k$ and said coefficients $a_{i,k}$ being determined as a function of $f_j$, for a given parameter K.

A similar decomposition technique, using the same statistical optimisation tools, applies by taking the radial functions rather than the ridge functions, according to $$f(x_1, \ldots, x_p) \approx \sum_{k=0}^{K} g_k(\|x - a_k\|)$$

with $x=(x_1, \ldots, x_p)$, $a_k=(a_{1,k}, \ldots, a_{p,k})$ and where the vectors $a_k$ have as coefficients $a_{i,k}$ real numbers and where the $g_k$ are univariate functions defined on the reals and with real value, said functions $g_k$ and said coefficients $a_{i,k}$ being determined as a function of $f$, for a given parameter K and a given norm $\|\cdot\|$. Usually, the Euclidean norm is used.

When a function $f_j$ takes as input a subset oft variables of $\{x_1, \ldots, x_p\}$ with t≤p, if one denotes $x_{j_1}, \ldots, x_{j_t}$ these variables with $j_1, \ldots, j_t \in \{1, \ldots, p\}$, then the previous decomposition is written $$f_j(x_{j_1}, \ldots, x_{j_t}) = \sum_{k=0}^{K} g_k(\|x - a_k\|)$$

with $x=(x_{j_1}, \ldots, x_{j_t})$ and $a_k=(a_{1,k}, \ldots, a_{t,k})$, for functions $g_k$ and coefficients $a_{i,k}$ determined as a function of $f_j$, for a given parameter K.

Thus, in one of the embodiments of the invention, the pre-calculation phase may be characterised in that for at least one function $f_j$ from among $f_1, \ldots f_q$, the transformation of the pre-calculation step is an approximate transformation in the form $$f_j(x_{j_1}, \ldots, x_{j_t}) \approx \sum_{k=0}^{K} g_k(\|x - a_k\|)$$

with $x=(x_{j_1}, \ldots, x_{j_t})$, $a_k=(a_{1,k}, \ldots, a_{t,k})$, t≤p and $j_1, \ldots, j_t \in \{1, \ldots, p\}$, and where the vectors $a_k$ have as coefficients $a_{i,k}$ real numbers and where the $g_k$ are univariate functions defined on the reals and with a real value, said functions $g_k$ and said coefficients $a_{i,k}$ being determined as a function of $f_j$, for a given parameter K and a given norm $\|\cdot\|$.

As indicated in the aforementioned Pinkus's article, another important class of decomposition of functions is when the coefficients $a_{i,k}$ are fixed, the functions $g_k$ are the variables. This class applies to decomposition both in the form of ridge functions and in the form of radial functions. Several methods are known for solving this problem, under the name: Von Neumann algorithm, cyclic coordinate algorithm, schwarz domain decomposition method, Diliberto-Straus algorithm, as well as variants that are found in the literature dedicated to tomography; cf. this same Pinkus's article and the references therein.

Thus, in one of the particular embodiments of the invention, this pre-calculation phase is further characterised in that the coefficients $a_{i,k}$ are fixed.

In some cases, the transformation of the pre-calculation step may be performed exactly by means of an equivalent formal representation of multivariate functions.

Consider g a multivariate function. If this function g calculates the maximum of $z_1$ and $z_2$, $g(z_1, z_2)=\max(z_1, z_2)$, it can use the formal equivalence $\max(z_1, z_2)=z_2+(z_1-z_2)^+$, where $z \mapsto z^+$ corresponds to the univariate function $z \mapsto \max(z, 0)$. The use of this formal equivalence allows easily obtaining other formal equivalences for the function $\max(z_1, z_2)$. As example, since $(z_1-z_2)^+$ can be expressed in an equivalent manner as $$(z_1 - z_2)^+ = \frac{1}{2}(z_1 - z_2) + \frac{1}{2}|z_1 - z_2|,$$

the formal equivalence $\max(z_1, z_2)=(z_1+z_2+|z_1-z_2|)/2$ is obtained where $z \mapsto |z|$ is the univariate function "absolute value" and where $z \mapsto z/2$ is the univariate function "division by 2"

In general, for three variables or more $z_1, \ldots, z_m$, given that $$\max(z_1, \ldots, z_i, z_{i+1}, \ldots, z_M) = \max(\max(z_1, \ldots, z_i), \max(z_{i+1}, \ldots, z_m))$$

for any i meeting 1≤i≤m−1, $\max(z_1, \ldots, z_m)$ is thus obtained iteratively as a combination of sums and functions $|\cdot|$ (absolute value) or $(\cdot)^+$.

Thus, in one of the embodiments of the invention, the pre-calculation phase may be characterised in that the transformation of this pre-calculation step uses the formal equivalence $\max(z_1, z_2)=z_2+(z_1-z_2)^+$ to express the function $(z_1, z_2) \mapsto \max(z_1, z_2)$ as a combination of sums and compositions of univariate functions.

In a particular embodiment of the invention, this pre-calculation phase is further characterised in that the formal equivalence is obtained from the iteration of the formal equivalence for two variables, for said function when the latter includes three variables or more.

Similarly, for the "minimum" function, $g(z_1, z_2)$, it is possible to use the formal equivalence $\min(z_1, z_2)=z_2+(z_1-z_2)^-$ where $z \mapsto z^- = \min(z, 0)$, or else $\min(z_1, z_2)=(z_1+z_2-|z_1-z_2|)/2$ because $$(z_1 - z_2)^- = \frac{1}{2}(z_1 - z_2) - \frac{1}{2}|z_1 - z_2|,$$

which, by iterating, generally allows formally decomposing the m-variate function $\min(z_1, \ldots, z_m)$ as a combination of sums and univariate functions, by observing that $\min(z_1, \ldots, z_i, z_{i+1}, z_m) = \min(\min(z_1, \ldots, z_i), \min(z_{i+1}, \ldots, z_m))$.

Thus, in one of the embodiments of the invention, the pre-calculation phase may be characterised in that the transformation of this pre-calculation step uses the formal equivalence $\min(z_1, z_2)=z_2+(z_1-z_2)^-$ to express the function $(z_1, z_2) \mapsto \min(z_1, z_2)$ as a combination of sums and compositions of univariate functions.

In a particular embodiment of the invention, this pre-calculation phase is further characterised in that the formal equivalence is obtained from the iteration of the formal equivalence for two variables, for said function when the latter includes three variables or more.

Another very useful multivariate function that can be simply formally decomposed into a combination of sums and compositions of univariate functions is multiplication. A first embodiment is to use for $g(z_1, z_2)=z_1 \times z_2$ the formal equivalence $z_1 \times z_2=(z_1+z_2)^2/4-(z_1-z_2)^2/4$, involving the univariate function $z \mapsto z^2/4$. Of course, the use of a formal equivalence gives other formal equivalences. Thus, as example, by using $z_1 \times z_2=(z_1+z_2)^2/4-(z_1-z_2)^2/4$, $z_1 \times z_2=(z_1+z_2)^2/4-(z_1-z_2)^2/4+(z_1+z_2)^2/4-(z_1+z_2)^2/4=(z_1+z_2)^2/2-(z_1-z_2)^2/4-(z_1+z_2)^2/4=(z_1+z_2)^2/2-z_1^2/2-z_2^2/2$ is deduced; i.e., the formal equivalence $z_1 \times z_2=(z_1+z_2)^2/2-z_1^2/2-z_2^2/2$, involving the univariate function $z \mapsto z^2/2$.

Thus, in one of the embodiments of the invention, the pre-calculation phase may be characterised in that the transformation of this pre-calculation step uses the formal equivalence $z_1 \times z_2=(z_1+z_2)^2/4-(z_1-z_2)^2/4$ to express the function $(z_1, z_2) \psi z_1 \times z_2$ as a combination of sums and compositions of univariate functions.

These embodiments are generalised to m-variate functions for m≥3 by observing that $z_1 \times \ldots \times z_i \times z_{i+1} \times \ldots \times z_m = (z_1 \times \ldots \times z_i) \times (z_{i+1} \times \ldots \times z_m)$ with $1 \leq i \leq m-1$.

In a particular embodiment of the invention, this pre-calculation phase is further characterised in that the formal equivalence is obtained from the iteration of the formal equivalence for two variables, for said function when the latter includes three variables or more.

A second embodiment is to decompose $g(z_1, z_2) = |z_1 \times z_2| = |z_1| \times |z_2|$ as $|z_1 \times z_2| = \exp(\ln|z_1| + \ln|z_2|)$, involving the univariate functions $z \mapsto \ln|z|$ and $z \mapsto \exp(z)$; or else, for an arbitrary base B, such as $|z_1 \times z_2| = B^{\log_B |z_1| + \log_B |z_2|}$ because $\exp(\ln|z_1| + \ln|z_2|) = \exp$ $$\left( \frac{\log_B |z_1|}{\log_B e} + \frac{\log_B |z_1|}{\log_B e} \right) = e^{\frac{1}{\log_B e}(\log_B |z_1| + \log_B |z_2|)} = B^{\log_B |z_1| + \log_B |z_2|}$$

where $e = \exp(1)$, involving the univariate functions $z \mapsto \log_B |z|$ and $z \mapsto B^z$. Herein again, these embodiments are generalised to m-variate functions for m≥3 while observing that $z_1 \times \ldots \times z_i \times z_{i+1} \times \ldots \times z_m| = |z_1 \times \ldots \times z_i| \times |z_{i+1} \times \ldots \times z_m|$ with $1 \leq i \leq m-1$.

Thus, in one of the embodiments of the invention, the pre-calculation phase may be characterised in that the transformation of this pre-calculation step uses the formal equivalence $|z_1 \times z_2| = \exp(\ln|z_1| + \ln|z_2|)$ to express the function $(z_1, z_2) \mapsto |z_1 \times z_2|$ as a combination of sums and compositions of univariate functions.

In a particular embodiment of the invention, this pre-calculation phase is further characterised in that the formal equivalence is obtained from the iteration of the formal equivalence for two variables, for said function when the latter includes three variables or more.

As described before, the multivariate function(s) given as input are transformed into a network of multivariate functions. Such a network is not necessarily unique, even in the case where the transformation is exact.

As example, we have seen hereinabove at least two decompositions of the multivariate function $\max(x_1, x_2)$, namely $\max(x_1, x_2) = x_2 + (x_1 - x_2)^+$ and $\max(x_1, x_2) = (x_1 + x_2 + |x_1 - x_2|)/2$. Specifically, each of these transformations may proceed in detail as follows 1. $\max(x_1, x_2) = x_2 + (x_1 - x_2)^+$
   assume $z_1 = x_1 - x_2$ and define $g_1(z) = z^+$
   write $\max(x_1, x_2) = x_2 + g_1(z_1)$
2. $\max(x_1, x_2) = (x_1 + x_2 + |x_1 - x_2|)/2$
   assume $z_1 = x_1 - x_2$ and $z_2 = x_1 + x_2$
   define $g_1(z) = |z|$ and $g_2(z) = z/2$
   write $\max(x_1, x_2) = g_2(z_3)$ with $z_3 = z_2 + g_1(z_1)$ In general, two types of operations are observed in a network of univariate functions: sums and evaluations of univariate functions. When the evaluation of the network is done homomorphically on encrypted values, the most expensive operations are the evaluations of the univariate functions because this typically gives rise to a bootstrapping step. Consequently, it is interesting to produce networks of univariate functions minimizing these univariate function evaluation operations.

In the previous example, one can therefore see that the first transformation for the "maximum" function [$\max(x_1, x_2) = x_2 + (x_1 - x_2)^+$] seems to be more advantageous since it only requires one univariate function evaluation, namely that of the function $g_1(z) = z^+$. In practice, the difference is not noticeable because the second univariate function in the second transformation does not really need to be evaluated:

all it needs is to return $2 \max(x_1, x_2) = x_1 + x_2 + |x_1 - x_2|$ or else to integrate this factor into the decoding function at the output. In general, the univariate functions consisting in multiplying by a constant can be ignored (i) by calculating a multiple of the starting function, or (ii) by "absorbing" by composition the constant when these functions are at the input of another univariate function. For example, the multivariate function $\sin(\max(x_1, x_2))$ may be written as 1. $\sin(\max(x_1, x_2)) = \sin(x_2 + (x_1 - x_2)^+)$
   assume $z_1 = x_1 - x_2$ and define $g_1(z) = z^+$
   define $g_2(z) = \sin(z)$
2. write $\sin(\max(x_1, x_2)) = g_2(z_2)$ with $z_2 = x_2 + g_1(z_1)$
   $\sin(\max(x_1, x_2)) = \sin((x_1 + x_2 + |x_1 - x_2|)/2)$
   assume $z_1 = x_1 - x_2$ and $z_2 = x_1 + x_2$
   define $g_1(z) = |z|$ and $g_2(z) = \sin(z/2)$
3. write $\sin(\max(x_1, x_2)) = g_2(z_3)$ with $z_3 = z_2 + g_1(z_1)$ (the multiplication by ½ being "absorbed" by the function $g_2(z) = \sin(z/2)$ in the second case).

Apart from the univariate functions of the type $g(z) = z + a$ (addition of a constant a) or of the type $g(z) = az$ (multiplication by a constant a), other situations may give rise to faster evaluations of univariate functions.

$(g_k(z_{i_k}))$ denotes the set of univariate functions with their respective argument ($z_{i_k} \in \mathbb{R}$) resulting from the transformation of $f_1, \ldots, f_q$ at the pre-calculation step—some univariate functions $g_k$ may be the same.

Three Types of Optimisations are Considered:

1) The Same Function, the Same Argument:

$g_k = g_{k'}$ and $z_{i_k} = z_{i_{k'}}$ (Type 1). This optimisation is obvious. It consists in reusing results from previous calculations. Thus, if there is $k' < k$ such that $g_k(z_{i_k})$ has already been evaluated and for which $g_{k'}(z_{i_{k'}}) = g_k(z_{i_k})$, the value of $g_k(z_{i_k})$ must not be recalculated.

2) Different Function, the Same Argument:

$g_k \neq g_{k'}$ and $z_{i_k} = z_{i_{k'}}$ (Type 2). In some cases, the cost of the homomorphic evaluation of two or more univariate function(s) on the same argument may be less than the sum of the costs of these functions considered separately. Typically, a single bootstrapping step is required. In this case, amongst two networks of univariate functions including the same number of univariate functions of the type $g_k(z_{i_k})$, within multiplicity tolerances, it is advantageous to prefer that one sharing a maximum of arguments. An example illustrates this situation very well. Consider the homomorphic evaluation of the multivariate function $f(x_1, x_2) = \max(x_1, x_2) + |x_1 \times x_2|$. Two possible embodiments of networks are a. $\max(x_1, x_2) + |x_1 \times x_2| = x_2 + (x_1 - x_2)^+ + \exp(\ln|x| + \ln|x_2|)$
   assume $z_1 = x_1 - x_2$ and define $g_1(z) = z^+$
   define $g_2(z) = \ln|z|$ and $g_3(z) = \exp(z)$
   write $\max(x_1, x_2) + |x_1 \times x_2| = x_2 + g_1(z_1) + g_3(z_2)$ with $z_2 = g_2(x_1) + g_2(x_2)$
b. $\max(x_1, x_2) + |x_1 \times x_2| = x_2 + (x_1 - x_2)^+ + |(x_1 + x_2)^2/4 - (x_1 - x_2)^2/4|$
   assume $z_1 = x_1 - x_2$ and define $g_1(z) = z^+$
   assume $z_2 = x_1 + x_2$ and define $g_2(z) = z^2/4$ and $g_3(z) = |z|$
   write $\max(x_1, x_2) + |x_1 \times x_2| = x_2 + g_1(z_1) + g_3(z_3)$ with $z_3 = g_2(z_2) - g_2(z_1)$.

The two embodiments hereinabove include four univariate function evaluations. However, the second one includes two univariate functions on the same argument, namely $g_1(z_1)$ and $g_2(z_1)$ is therefore preferred.

Sharing of the univariate functions on the same argument is not limited to the transformations performed by means of an equivalent formal representation. This also applies to digital transformations. It should be recalled that a function defined on a parallelepiped of RP can be transformed into a network of univariate functions. In particular, for a function $f$ with p variables $x_1, \ldots, x_p$, sprecher's algorithm allows obtaining an approximation of the function $f$ having the following form:

$$f(x_1, \ldots, x_p) \approx \sum_{k=0}^{K} g_k(\xi(x_1 + ka, \ldots, x_p + ka))$$

with $$\xi(x_1 + ka, \ldots, x_p + ka) = \sum_{i=1}^{p} \lambda_i \Psi(x_i + ka).$$

In this construction, the so-called "internal" functions $\Psi$ and $\xi$ do not depend on $f$, for a given domain of definition. Consequently, if several multivariate functions $f_1, \ldots, f_q$ defined on the same domain were homomorphically evaluated, the homomorphic evaluations of the functions $\Psi$ and $\xi$ do not need to be recalculated when they apply on the same inputs. This situation also appears for example in the decomposition of several multivariate functions using ridge functions or radial functions, when the coefficients $(a_{ik})$ of the decompositions are fixed.

3) The Same Function, Arguments Differing by an Additive Constant:

$g_k = g_{k'}$ and $z_{i_k} = z_{i_{k'}} + a_k$ for a known constant $a_k \neq 0$ (Type 3). Another situation allowing accelerating the calculations is when the same univariate function is applied to arguments differing by an additive constant. For example, still in Sprecher's construction, the homomorphic evaluation of $f$ hereinabove involves several homomorphic evaluations of the same univariate function $\Psi$ on variables differing additively by a constant value, namely $x_i + ka$ for $1 \leq i \leq p$ and where ka is known. In this case, the value of the encryption of $\Psi(x_i + ka)$ for $1 \leq k \leq K$ can be obtained efficiently from the encryption of $\Psi(x_i)$; an embodiment is detailed hereinbelow.

In formal terms, in all of the univariate functions with their respective argument, $\{g_k (z_{i_k})\}_k$, resulting from the transformation of $f_1, \ldots, f_q$ at the pre-calculation step, an element $g_k(z_{i_k})$ meeting one of the three conditions is called "redundancy":

1. $g_k = g_{k'}$ and $z_{i_k} = z_{i_{k'}}$,
2. $g_k \neq g_{k'}$ and $z_{i_k} = z_{i_{k'}}$,
3. $g_k = g_{k'}$ and $z_{i_k} = z_{i_{k'}} + a_k$ for a known constant $a_k \neq 0$ for an index k'<k.

As illustrated in [FIG. 3], in the case of any univariate function $f$ of a real-valued variable with an arbitrary accuracy in a domain of definition $\mathcal{D}$ and with real value in an image $\mathcal{I}$, $$f: \mathbb{R} \supseteq \mathcal{D} \to \mathcal{I} \subseteq \mathbb{R}, x \mapsto f(x),$$

a method according to the invention uses two homomorphic encryption algorithms, denoted E and E'. The native spaces of the cleartexts of which are denoted $\mathcal{M}$ and $\mathcal{M}'$, respectively. The method is parameterised by an integer $N \geq 1$ which quantifies the so-called actual accuracy of the inputs on which the function $f$ is evaluated. Indeed, although the inputs of the domain of definition $\mathcal{D}$ of the function $f$ may have an arbitrary accuracy, these will be represented internally by at most N selected values. This has the direct consequence that the function $f$ will be represented by a maximum of N possible values. The method is also parameterised by encoding functions encode and encode', where encode takes as input an element of $\mathcal{D}$ and associates thereto an element of $\mathcal{M}$ and encode takes as input an element of $\mathcal{I}$ and associates thereto an element of $\mathcal{M}'$. The method is parameterised by a so-called discretisation function discretise which takes as input an element of $\mathcal{M}$ and associates thereto an integer. The encoding encode and discretisation discretise functions are such that the image of the domain $\mathcal{D}$ by the encoding encode followed by the discretisation discretise, (discretise∘encode)($\mathcal{D}$), , or a set of at most N indices taken from among $\mathcal{S} = \{0, \ldots, N-1\}$. Finally, the method is parameterised by a homomorphic encryption scheme having an encryption algorithm $\mathcal{E}_H$ the native space of the cleartexts of which $\mathcal{M}_H$ has a cardinality of at least N, as well as an encoding function $\text{encode}_H$ which takes as input an integer and returns an element of $\mathcal{M}_H$. In this case, the method comprises the following steps:

A pre-calculation step in which the discretisation of said function $f$ and the construction of a table T corresponding to this discretised function $f$ are carried out.

In a detailed manner, the domain $\mathcal{D}$ of the function is decomposed into N sub-intervals $R_0, \ldots, R_{N-1}$, the union of which is equal to $\mathcal{D}$. For each index $i \in \{0, \ldots, N-1\}$, a representative $x(i) \in R_i$ is selected and $y(i) = f(x(i))$ is calculated. The table T consisting of the N components $T[0], \ldots, T[N-1]$ is returned, with $T[i] = y(i)$ for $0 \leq i \leq N-1$.

A step of so-called homomorphic evaluation of the table in which, given the ciphertext of an encryption of x, E(encode(x)), for a real value $x \in \mathcal{D}$ where the function encode encodes x as an element of $\mathcal{M}$, the ciphertext E(encode(x)) is converted into the ciphertext $\mathcal{E}_H(\text{encode}_H(\tilde{i}))$ for an integer $\tilde{i}$ having as an expected value the index i with i=(discretise∘encode)(x) in the set $\{0, \ldots, N-1\}$ if $x \in R_i$. Starting from the ciphertext $\mathcal{E}_H(\text{encode}_H(\tilde{i}))$ and from the table T, the ciphertext E'(encode'(T[$\tilde{i}$])~) is obtained for an element encode'(T[$\tilde{i}$])~ having, as an expected value encode'(T[$\tilde{i}$]) with $T[\tilde{i}] = y(\tilde{i})$ and where $y(\tilde{i}) \approx f(x)$. The ciphertext E'(encode'(T[$\tilde{i}$])~) is returned as the ciphertext of an encryption of an approximate value of $f(x)$.

Thus, in one of its embodiments, the invention covers the approximate homomorphic evaluation, performed digitally by a specifically programmed information processing system, of a univariate function $f$ of a real-valued variable x with an arbitrary accuracy in a domain of definition D and with real value in an image I, taking as input the ciphertext of en encryption of x, E(encode(x)), and returning the ciphertext of an encryption of an approximate value of $f(x)$, E'(encode'(y)), with $y \approx f(x)$, where E and E' are homomorphic encryption algorithms whose respective native space of the cleartexts is M and M', which evaluation is parameterised by:

an integer $N \geq 1$ quantifying the actual accuracy of the representation of the variables at the input of the function $f$ to be evaluated, an encoding function encode taking as input an element of the domain $\mathcal{D}$ and associating thereto an element of $\mathcal{M}$, an encoding function encode' taking as input an element of the image $\mathcal{I}$ and associating thereto an element of $\mathcal{M}'$, a discretisation function discretise taking as input an element of $\mathcal{M}$ and associating thereto an index represented by an integer, a homomorphic encryption scheme having an encryption algorithm $\mathcal{E}_H$ the native space of the cleartexts of which $\mathcal{M}_H$ has a cardinality of at least N, an encoding function $\text{encode}_H$ taking as input an integer and returning an element of $\mathcal{M}_H$, so that the image of the domain $\mathcal{D}$ by the encoding encode followed by the discretisation discretise, (discretise∘encode) ($\mathcal{D}$), is a set of at most N indices selected from $\mathcal{S} = \{0, \ldots, N-1\}$, With these parameters, said approximate homomorphic evaluation of a univariate function $f$ requires the implementation of the two successive following steps by the specifically programmed information processing computer system:

1. a step of pre-calculating a table corresponding to said univariate function $f$, consisting in
   a. decomposing the domain $\mathcal{D}$ into N chosen subintervals $R_0, \ldots, R_{N-1}$ the union of which is $\mathcal{D}$,
   b. for each index i in $\mathcal{S} = \{0, \ldots, N-1\}$, determining a representative $x(i)$ in the sub-interval $R_i$ and calculating the value $y(i) = f(x(i))$,
   c. returning the table T consisting of the N components $T[0], \ldots, T[N-1]$, with $T[i] = y(i)$ for $0 \leq i \leq N-1$;
2. a step of homomorphic evaluation of the table consisting in
   a. converting the ciphertext $E(\text{encode}(x))$ into the ciphertext $\mathcal{E}_H(\text{encode}_H(\tilde{\imath}))$ for an integer $\tilde{\imath}$ having as an expected value the index $i = (\text{discretise} \circ \text{encode})(x)$ in the set $\mathcal{S} = \{0, \ldots, N-1\}$ if $x \in R_i$,
   b. obtaining the ciphertext $E'(\text{encode}'(T[\tilde{\imath}])^-)$ for an element $\text{encode}'(T[\tilde{\imath}])^-$ having as an expected value $\text{encode}'(T[\tilde{\imath}])$, starting from the ciphertext $\mathcal{E}_H(\text{encode}_H(\tilde{\imath}))$ and from the table T,
   c. returning $E'(\text{encode}'(T[\tilde{\imath}])^-)$.

When the domain of definition $\mathcal{D}$ of the function $f$ to be evaluated is the real interval $[x_{min}, x_{max})$, the N sub-intervals $R_i$ (for $0 \leq i \leq N-1$) covering $\mathcal{D}$ can be chosen as the semi-open intervals $$R_i = \left[ \frac{i}{N}(x_{max} - x_{min}) + x_{min}, \frac{i+1}{N}(x_{max} - x_{min}) + x_{min} \right)$$

splitting $\mathcal{D}$ regularly. Several choices are possible for the representative $x := x(i)$ of the interval $R_i$. For example, it is possible to consider the midpoint of each interval, wine is given by $$x(i) = (x_{max} - x_{min}) \frac{2i+1}{2N} + x_{min} \in R_i (\text{with } 0 \leq i \leq N-1).$$

Another choice is to select for $x(i)$ a value in $R_i$ such that $f(x(i))$ is close to the average of $f(x)$ over the interval $R_i$, or else to an average weighted by a given prior distribution of the x over the interval $R_i$ for each $0 \leq i \leq N-1$, or to the median value.

Thus, in one of the embodiments of the invention, the approximate homomorphic evaluation of the univariate function $f$ is further characterised in that the domain of definition of the function $f$ to be evaluated is given by the real interval $\mathcal{D} = [x_{min}, x_{max})$,
the N intervals $R_i$ (for $0 \leq i \leq N-1$) covering the domain $\mathcal{D}$ are the semi-open sub-intervals $$R_i = \left[ \frac{i}{N}(x_{max} - x_{min}) + x_{min}, \frac{i+1}{N}(x_{max} - x_{min}) + x_{min} \right),$$

splitting $\mathcal{D}$ in a regular manner.

The choice of the algorithm $\mathcal{E}_H$ of the encoding function $\text{encode}_H$ has a predominant role in the conversion of $E(\text{encode}(x))$ into $\mathcal{E}_H(\text{encode}_H(\tilde{\imath}))$. It should be recalled that for $x \in \mathcal{D}$, we have $(\text{discretise} \circ \text{encode})(x) \in \mathcal{S}$ where $\mathcal{S} = \{0, \ldots, N-1\}$. An important case is when the elements of $\mathcal{S}$ are seen as the elements of a subset, not necessarily a subgroup, of an additive group. This additive group is denoted $\mathbb{Z}_M$ (the set of integers $\{0, \ldots, M-1\}$ provided with the addition modulo M) for an integer $M \geq N$.

Thus, in one of the embodiments of the invention, the approximate homomorphic evaluation of the univariate function $f$ is further characterised in that the set $\mathcal{S}$ is a subset of the additive group $\mathbb{Z}_m$ for an integer $M \geq N$.

There are several ways of representing the group $\mathbb{Z}_m$. Thus, Ducas and Miccipanio in the aforementioned article of EUROCRYPT 2015 represent the elements of $\mathbb{Z}_m$ as the exponents of a variable X; to an element i of $\mathbb{Z}_m$ is associated an element $X^i$, with $X^M = X^0 = 1$ and $X^j \neq 1$ for any $0 < j < M$. It is said that X is an M-th primitive root of the unit. This representation allows switching from an additive notation into a multiplicative notation: for all elements $i, j \in \mathbb{Z}_M$, the element $i+j \pmod{M}$ is associated to the element $$X^{i+j} = X^i \cdot X^j \pmod{X^M - 1}.$$

The modulo multiplication operation $(X^M - 1)$ induces a group isomorphism between the additive group $\mathbb{Z}_m$ and the set $\{1, X, \ldots, X^{M-1}\}$ of the M-th roots of the unit. When M is even, the relationship $X^M = 1$ implies $X^{M/2} = -1$. We then have $X^{i+j} = X^i \cdot X^j \pmod{X^{M/2} + 1}$ for $i, j \in \mathbb{Z}_M$ and, the set of the M-th roots of the unit is $\{\pm 1, \pm X, \ldots, X^{(M/2)-1}\}$.

Thus, in one of the embodiments of the invention, the approximate homomorphic evaluation of the univariate function $f$ is further characterised in that the group $\mathbb{Z}_m$ is represented multiplicatively as the powers of a primitive M-th root of the unit denoted X, so that to the element i of $\mathbb{Z}_M$ is associated the element $X^i$; all of M-th roots of the unit $\{1, X, \ldots, X^{M-1}\}$ forming an isomorphic group to $\mathbb{Z}_M$ for multiplication modulo $(X^M - 1)$.

In the case where the homomorphic encryption algorithm E is given by an LWE-type encryption algorithm applied to the torus $\mathbb{T} = \mathbb{R}/\mathbb{Z}$,, we have $\mathcal{M} = \mathbb{T}$ and, if we denote $\mu = \text{encode}(x)$ with $x \in \mathcal{D}$ for an encoding function encode with a value in $\mathbb{T}$, we have $E(\text{encode}(x)) = (a_1, \ldots, a_n, b)$ where $a_j \in \mathbb{T}$ (for $1 \leq j \leq n$) and $$b = \sum_{j=1}^{n} s_j \cdot a_j + \mu + e \pmod{1}$$

with e a small random noise on $\mathbb{R}$.

Thus, in one of the embodiments of the invention, the approximate homomorphic evaluation of the univariate function $f$ is further characterised in that the homomorphic encryption algorithm E is given by an LWE-type encryption algorithm applied to the torus $\mathbb{T} = \mathbb{R}/\mathbb{Z}$ and has as native space of cleartexts $\mathcal{M} = \mathbb{T}$ The discretization function discretise is then parameterised for an integer M N as the function which, to an element t of the torus, associates the integer rounding of the product $M \times t$ modulo M, where $M \times t$ is calculated in $\mathbb{R}$; written in the mathematical form $$\text{discretise:} \mathbb{T} \to \mathbb{Z}, t \mapsto \text{discretise}(t) = \lfloor M \times t \rfloor \mod M.$$

This discretisation function naturally extends to vectors of the torus. Applied to the vector $c = (a_1, \ldots, a_n, b)$ of $\mathbb{T}^{n+1}$ we obtain the vector $\bar{c}$ of $(\mathbb{Z}_M)^{n+1}$ given by $\bar{c} = (\bar{a}_1, \ldots, \bar{a}_n,$ $\overline{b}$) with $\overline{a_j}=\lceil M \times a_j \rfloor$ mod M (for $1 \leq j \leq n$) and $\overline{b}=\lceil M \times b \rfloor$ mod M. In a more detailed manner, if we define $i=\lceil M \times \mu \rfloor$ mod M and $\overline{e}=\lceil M \times e \rfloor$, we have $$\begin{aligned}\overline{b} &= \left[M \times \left(\sum_{j=1}^{n} s_j \cdot a_j + \mu + e \pmod{1}\right)\right] \bmod M \\ &= \left[M \times \left(\sum_{j=1}^{n} s_j \cdot a_j + \mu + e + \delta\right)\right] \bmod M \text{ for a given } \delta \text{ in } \mathbb{Z} \\ &= \left[M \times \left(\sum_{j=1}^{n} s_j \cdot a_j + \mu + e\right)\right] \bmod M \\ &= \left[\sum_{j=1}^{n} s_j \cdot (M \cdot a_j) + M \cdot \mu + M \cdot e\right] \bmod M \\ &= \left(\sum_{j=1}^{n} s_j \overline{a_j} + i + \overline{e} + \Delta\right) \bmod M \text{ for a small } \Delta \text{ in } \mathbb{Z};\end{aligned}$$

the signed integer $\Delta$ captures the rounding error and is called "drift". The expected value of the drift is zero. Moreover, of $|e| < 1/(2M)$ then $\overline{e}=0$. We assume $$\tilde{\imath} = i + \Delta \text{ with } \Delta \in \left\{-\left\lceil \frac{M}{2} \right\rceil + 1, \ldots, \left\lfloor \frac{M}{2} \right\rfloor\right\},$$

which $\tilde{\imath}$ has as an expected value the integer $i=\lceil M \times \mu \rfloor$ mod M=discretise($\mu$). The encoding function encode is parameterised so that its image is contained in the sub-interval $$\left[0, \frac{N}{M} - \frac{1}{2M}\right)$$

of the torus. In this manner, if $$x \in \mathcal{D} \text{ then } \mu = \text{encode } (x) \in \left[0, \frac{N}{M} - \frac{1}{2M}\right)$$

and $i=\text{discretise}(\mu)=\lceil M \times \mu \rfloor$ mod $M \in [0, N)$. Indeed, it is verified that if $$0 \leq \mu < \frac{N}{M} - \frac{1}{2M}$$

then $\lceil M \times \mu \rfloor \geq 0$ and $$\lceil M \times \mu \rfloor \leq M \times \mu + \frac{1}{2} < M \times \left(\frac{N}{M} - \frac{1}{2M}\right) + \frac{1}{2} = N$$

and therefore, since $N \leq M$, $\lceil M \times \mu \rfloor$ mod $M = \lceil M \times \mu \rfloor \in [0, N)$. Hence, for these functions discretise and encode, we actually have (discretise∘encode)($\mathcal{D}$) $\subseteq \{0, \ldots, N-1\} = \mathcal{S}$, in other words (discretise∘encode)($\mathcal{D}$) is a subset of the set of the indexes $\mathcal{S} = \{0, \ldots, N-1\}$. Thus, in one of the embodiments of the invention, the approximate homomorphic evaluation of the univariate function $f$ is further characterised in that
  the encoding function encode has its image contained in the sub-interval $$\left[0, \frac{N}{M} - \frac{1}{2M}\right)$$

of the torus, and the discretisation function discretise applies an element t of the torus to the integer rounding of the product M×t here M×t is calculated in $\mathbb{R}$; in mathematical form, discretise: $\mathbb{T} \to \mathbb{Z}$, $t \mapsto \text{discretise}(t) = \lceil M \times t \rfloor$ mod M.

It should be noticed that when the domain of definition of t function $f$ to be evaluated is the real interval $\mathcal{D} = [x_{min}, x_{max})$ and that the native space of cleartexts $\mathcal{M}$ is the torus $\mathbb{T}$, , a possible choice for the encoding function encode is encode:

$$\mathcal{D} \to \mathbb{T}, x \mapsto \frac{2N-1}{2M} \frac{x - x_{min}}{x_{max} - x_{min}}.$$

We then have encode $$(x) \in \left[0, \frac{N}{M} - \frac{1}{2M}\right)$$

for $x \in \mathcal{D}$; we note that $$\frac{N}{M} - \frac{1}{2M} = \frac{2N-1}{2M}.$$

Thus, in one of the embodiments of the invention, the approximate homomorphic evaluation of the univariate function $f$ is further characterised in that when the domain of definition of the function $f$ is the real interval $\mathcal{D} = [x_{min}, x_{max})$, the encoding function encode is encode:

$$[x_{min}, x_{max}) \to \left[0, \frac{N}{M} - \frac{1}{2M}\right), x \mapsto \text{encode}(x) = \frac{2N-1}{2M} \frac{x - x_{min}}{x_{max} - x_{min}}.$$

The construction (discretise∘encode)($\mathcal{D}$) gives rise to a first embodiment of the conversion of E(encode(x)) into $\mathcal{E}_H(\text{encode}_H(\tilde{\imath}))$. It supposes that the elements of the set $\mathcal{S}$ are seen directly as integers of $\mathbb{Z}_M$. As an encoding function encode$_H$, we consider the identity function, encode$_H$: $\mathbb{Z}_M \to \mathbb{Z}_M$, $i \mapsto i$. With the previous notations, if we denote $\mu = \text{encode}(x) \in \mathbb{T}$ and its LWE ciphertext on the torus $$c = (a_1, \ldots, a_n, b) \text{ with } b = \sum_{j=1}^{n} s_j \cdot a_j + \mu + e \pmod{1},$$

then $\mathcal{E}_H(\text{encode}_H(\tilde{\imath})) \in (\mathbb{Z}_M)^{n+1}$ is defined as $$\begin{aligned}\varepsilon_H(\text{encode}_H(\tilde{\imath})) &= \varepsilon_H(\tilde{\imath}) \\ &= (\overline{a_1}, \ldots, \overline{a_n}, \overline{b})\end{aligned}$$

with $\overline{a_j} = \lceil M \times a_j \rfloor$ mod M for $1 \leq j \leq n$ and $\overline{b} = \lceil M \times b \rfloor$ mod M. It should be noted that $$\overline{b} = \left(\sum_{j=1}^{n} s_j \overline{a_j} + \tilde{\imath} + \overline{e}\right)$$

mod M. In this case, we observe that $\mathcal{E}_H$ is an LWE-type encryption algorithm on the ring $\mathbb{Z}_M$; the encryption key is $(s_1, \ldots, s_n) \in \{0,1\}^n$.

Thus, in one of the embodiments of the invention, the approximate homomorphic evaluation of the univariate function $f$ is further characterised in that the homomorphic encryption algorithm $\mathcal{E}_H$ is an LWE-type encryption algorithm and the encoding function $encode_H$ is the identity function.

A second embodiment of the conversion of E(encode(x)) into $\mathcal{E}_H(encode_H(\tilde{i}))$ is obtained by considering the M-th roots of the unit; this allows working multiplicatively. More specifically, it is assumed that M is even and an arbitrary polynomial $p:=p(X)$ of $\mathbb{T}_{M/2}[X]$ is fixed. The encoding function $encode_H$ is the function $encode_H: \mathbb{Z}_M \to \mathbb{T}_{M/2}[X], i \mapsto encode_H(i) = X^{-i} \cdot p(X)$ and the encryption algorithm $\mathcal{E}_H$ is an RLWE-type encryption algorithm on $\mathbb{Z}_{M/2}[X]$-modulus $\mathbb{T}_{M/2}[X]$. The conversion for this choice of $encode_H$ and of $\mathcal{E}_H$ uses the re-encryption technique. We denote $bk[j] \in \mathbb{T}_{M/2}[X]^{(k+1)l \times (k+1)}$ the RGSW-type ciphertext of $s_j$, for $1 \leq j \leq n$, under a key $(s'_1, \ldots, s'_k) \in \mathbb{B}_{M/2}[X]^k$. The conversion of E(encode(x))= $(a_1, \ldots, a_n, b) \in \mathbb{T}^{n+1}$ into $\mathcal{E}_H(encode_H(\tilde{i}))$ is given by the following procedure:

obtain the conversion public keys $bk[1], \ldots, bk[n]$
calculate $\overline{a_j} = \lfloor M \times a_j \rfloor$ mod M for $1 \leq j \leq n$ and $\overline{b} = \lfloor M \times b \rfloor$ mod M
initialise $c'_0 \leftarrow (0, \ldots, 0, X^{-\overline{b}} \cdot p(X)) \in \mathbb{T}_{M/2}[X]^{k+1}$ for j ranging from 1 to n, evaluate $c'_j \leftarrow ((X^{\overline{a_j}}-1) \cdot bk[j]+G) \boxdot c'_{j-1}$ (in $\mathbb{T}_{M/2}[X]^{k+1}$)

return $c'_n$ as the result $\mathcal{E}_H(encode_H(\tilde{i}))$.

In this case, it is observed that $\mathcal{E}_H$ is an RLWE-type encryption algorithm on the modulus $\mathbb{T}_{M/2}[X]$; the encryption key is $(s'_1, \ldots, s'_k) \in \mathbb{B}_{M/2}[X]^k$. Indeed, if we set $C_j$ an RGSW-type encryption of $X^{s_j \overline{a_j}}$ under the key $(s'_1, \ldots, s'_k)$ (for $1 \leq j \leq n$), in mathematical form $C_j = RGSW(X^{s_j \overline{a_j}})$, we have $C_j \leftarrow RGSW(X^{s_j \overline{a_j}})$ $\leftarrow RGSW(s_j(X^{\overline{a_j}}-1)+1)$ $\leftarrow RGSW(s_j(X^{\overline{a_j}}-1))+RGSW(1)$ $\leftarrow (X^{\overline{a_j}}-1) \cdot RGSW(s_j)+RGSW(1)$ $\leftarrow (X^{\overline{a_j}}-1) \cdot bk[j]+G.$ Thus, if we denote RLWE(m) an RLWE-type encryption for $m \in \mathbb{T}_{M/2}[X]$, under the key $(s'_1, \ldots, s'_k)$, we have $c'_1 \leftarrow C_1 \boxdot c'_0 = RGSW(X^{s_1 \overline{a_1}}) \boxdot RLWE(X^{-\overline{b}} \cdot p(X))$ $\leftarrow RLWE(X^{-\overline{b}+s_1 \overline{a_1}} \cdot p(X))$ and, by induction, $c'_n \leftarrow RLWE(X^{-\overline{b}+s_1 \overline{a_1}+ \ldots +s_n \overline{a_n}} \cdot p(X))$ $\leftarrow \mathcal{E}_H(encode_H(\tilde{i})).$ Thus, in one of the embodiments of the invention, the approximate homomorphic evaluation of the univariate function $f$, parameterised by an even integer M, is further characterised in that the homomorphic encryption algorithm $\mathcal{E}_H$ is an RLWE-type encryption algorithm and the encoding function $encode_H$ is the function $encode_H: \mathbb{Z}_M \to \mathbb{T}_{M/2}[X], i \mapsto encode_H(i) = X^{-i} \cdot p(X)$ for an arbitrary polynomial p of $\mathbb{T}_{M/2}[X]$.

It is now possible to perform the homomorphic evaluation of the table T from $\mathcal{E}_H(encode_H(\tilde{i}))$, according to either one of the previous two embodiments. In both cases, we suppose that E is an LWE-type algorithm on the torus and that M is even and it is equal to 2N.

1. The first case supposes that the encoding function $encode_H$ is $encode_H: \mathbb{Z}_{2N} \to \mathbb{Z}_{2N}, i \mapsto i$ and that the algorithm $\mathcal{E}_H$ is an LWE-type encryption algorithm on $\mathbb{Z}_{2N}$. In this first case, we have $\mathcal{E}_H(encode_H(\tilde{i}))$ $(\overline{a_1}, \ldots, \overline{a_n}, \overline{b})$. A first substep consists in: forming the polynomial $q \in \mathbb{T}_N[X]$ given by $$q(X) = T'[0] + T'[1]X + \ldots + T'[N-1]X^{N-1} = \sum_{j=0}^{N-1} T'[j]X^j$$

with $T'[j] = encode'(T[j])$ to $0 \leq j \leq N-1$
obtain the conversion public keys $bk[1], \ldots, bk[n]$
initialise $c''_0 \leftarrow (0, \ldots, 0, X^{-\overline{b}} \cdot q(X)) \in \mathbb{T}_N[X]^{k+1}$
for j ranging from 1 to n, evaluate $c''_j \leftarrow ((X^{\overline{a_j}}-1) \cdot bk[j]+G) \boxdot c''_{j-1}$ (in $\mathbb{T}_N[X]^{k+1}$)
assume $d' = c''_n$
returning $d' = RLWE(X^{-\tilde{i}} \cdot q(X))$.

2. The second case supposes the encoding function $encode_H: \mathbb{Z}_{2N} \to \mathbb{T}_N[X], i \mapsto X^{-i} \cdot p(X)$ for an arbitrary polynomial $p:=p(X) \in \mathbb{T}_N[X]$ and that the algorithm $\mathcal{E}_H$ is an RLWE-type encoding algorithm on $\mathbb{T}_N[X]$ In this second case, we have $\mathcal{E}(encode_H(\tilde{i})) = RLWE(X^{-\tilde{i}} \cdot p(X))$ for the arbitrary polynomial $p \in \mathbb{T}_N[X]$. A first substep consists in:

selecting a polynomial $P:=P(X) \in \mathbb{Z}_N[X]$ such that $P \cdot p \approx q$ with $q \in \mathbb{T}_N[X]$ given by $$q(X) = T'[0] + T'[1]X + \ldots + T'[N-1]X^{N-1} = \sum_{j=0}^{N-1} T'[j]X^j$$

with $T'[j] = encode'(T[j])$ to $0 \leq j \leq N-1$
evaluate $d' \leftarrow P \cdot RLWE(X^{-\tilde{i}} \cdot p(X))$
return $d' = RLWE(X^{-\tilde{i}} \cdot (P(X) \cdot p(X)))$ with $P(X) \cdot p(X) \approx q(X)$.

In particular, it should be noted that, for an integer $$L > 1, \text{ if } p(X) = (1 + X + \ldots + X^{N-1}) \cdot \frac{1}{2L}$$

then the choice $$P(X) = \sum_{j=0}^{N-1} P_j X^j \text{ avec} \begin{cases} P_0 = \lceil L \times (T'[0] + T'[N-1]) \rceil \\ P_j = \lceil L \times (T'[j] - T'[j-1]) \rceil & \text{pour } 1 \leq j \leq N-1 \end{cases}$$

(where the multiplication by L is calculated in $\mathbb{R}$) implies $P(X) \cdot p(X) \approx T'[0] + T'[1]X + \ldots + T'[N-1]X^{N-1}$. Indeed, it is observed that for this choice of the polynomial p we have $$P(X) \cdot p(X) = (P_0 + P_1 X + P_2 X^2 + \ldots + P_{N-2} X^{N-2} + P_{N-1} X^{N-1}) \cdot$$

$$\left(\frac{1}{2L}(1 + X + X^2 + \ldots + X^{N-2} + X^{N-1})\right)$$

$$= ((P_0 - P_1 - P_2 - \ldots - P_{N-2} - P_{N-1})$$

$$+ (P_0 + P_1 - P_2 - \ldots - P_{N-2} - P_{N-1})X$$

$$+ (P_0 + P_1 + P_2 - \ldots - P_{N-2} - P_{N-1})X^2$$

-continued $$+ \ldots$$
$$+(P_0 + P_1 + P_2 + \ldots + P_{N-2} - P_{N-1})X^{N-2}$$
$$+(P_0 + P_1 + P_2 + \ldots + P_{N-2} + P_{N-1})X^{N-1}) \cdot \frac{1}{2L}$$
$$\approx (\lceil 2L \times T'[0] \rceil + \lceil 2L \times T'[1] \rceil X + \ldots + \lceil 2L \times T'[N-1] \rceil X^{N-1}) \cdot \frac{1}{2L}$$
$$\approx T'[0] + T'[1]X + \ldots + T'[N-1]X^{N-1} = q(X)$$

while noting that, for $$0 \le r \le N-1, \sum_{j=0}^{r} P_j = P_0 + \sum_{j=1}^{r} P_j \approx \lceil L \times (T'[0] + T'[N-1]) \rceil + \lceil L \times (T'[r] - T'[0]) \rceil \approx \lceil L \times (T'[r] + T'[N-1]) \rceil \text{ and } -\sum_{j=r+1}^{N-1} P_j \approx \lceil L \times (T'[r] - T'[N-1]) \rceil.$$ It should be noticed that P·p≈q; the equality being verified within a given drift, which has an expected value equal to zero.

In both cases, in return of this first substep of the homomorphic evaluation of the table T, an RLWE-type ciphertext d' of the expected polynomial $X^{-\bar{\iota}} \cdot q(X)$ is obtained under a key $(s'_1, \ldots, s'_k) \in \mathbb{B}_N[X]^{k+1}$, which key being that one used to produce the RGSW-type ciphertexts bk[j](1≤j≤n) encrypting the bits $s_j$ of the secret key $(s_1, \ldots, s_n) \in \{0,1\}$. By the form of q(X), the constant term of the polynomial $X^{-\bar{\iota}} \cdot q(X) = X^{-\bar{\iota}} \cdot (T'[0] + T'[1]X + \ldots + T'[N]X^{N-1})$ is $T'[\bar{\iota}]$ =encode'(T'[i]). We denote $(a'_1, \ldots, a'_k, b') \in \mathbb{T}_N[X]^{k+1}$ the components of the ciphertext d'.

A second sub-step (common to both cases) of the homomorphic evaluation of the table T extracts an LWE-type ciphertext of $T'[\bar{\iota}]$ =encode'(T'[$\bar{\iota}$]) from said RLWE ciphertext:
for each 1≤j≤k, write the polynomial $$a'_j := a'_j(X) \in \mathbb{T}_N[X] \text{ as } a'_j(X) = \sum_{l=0}^{N-1} (a'_j)_l X^l$$

with $(a'_j)_l \in \mathbb{T}$ (for 0≤l≤N−1)
write the polynomial b':=b'(X)∈ $\mathbb{T}_N[X]$ as $$b'(X) = \sum_{l=0}^{N-1} (b')_l X^l$$

with $(b')_l \in \mathbb{T}$ (for 0≤l≤N−1)
define the element vector on torus $(a''_1, \ldots, a''_{kN}) \in \mathbb{T}^{kN}$ where $$\begin{cases} a''_{1+jN} = (a_j)_0 & \text{pour } 1 \le j \le k \\ a''_{1+l+jN} = -(a_j)_{N-l} & \text{pour } 1 \le j \le k \text{ et } 1 \le l \le N-1 \end{cases}$$

return the element vector on the torus $(a''_1, \ldots, a''_{kN}, b'') \in \mathbb{T}^{kN+1}$ where b''=(b')$_0$ is the constant term of the polynomial b'.

If, for each 1≤j≤k, the polynomial $s'_j := s'_j(X) \in \mathbb{B}_N[X]$ is written as $$s'_j(X) = \sum_{l=0}^{N-1} (s'_j)_l X^l$$

with $(s'_j)_l \in \mathbb{B} = \{0,1\}$(for 0≤l≤N−1), one can see that the returned vector $(a''_1, \ldots, a''_{kN}, b'')$ is an LWE-type ciphertext on the torus of $T'[\bar{\iota}]$ =encode'(T[$\bar{\iota}$]) under the key $((s'_1)_0, (s'_1)_1, \ldots, (S'_1)_{N-1}, \ldots, (s'_k)_0, (s'_k)_1, \ldots, (s'_k)_{N-1}) \in \{0,1\}^{kN}$. This defines the encryption algorithm E'; we thus have $(a''_1, \ldots, a''_{kN}, b'')$=E'(encode'(T[$\bar{\iota}$])). In this case the corresponding native space of cleartexts is $\mathcal{M}'$ = $\mathbb{T}$. Hence, since $T[\bar{\iota}]$ =y($\bar{\iota}$) and y($\bar{\iota}$)≈f(x), we actually obtain an LWE-type ciphertext of an encryption with an approximate value of f(x).

Upon completion of this calculation, the ciphertext E'(encode'(T[$\bar{\iota}$])~) can be decrypted and decoded to give an approximate value of f(x).

Thus, in one of the embodiment of the invention, the approximate homomorphic evaluation of the univariate function f, parameterised b an even integer M equal to 2N, is further characterised in that an LWE-type ciphertext E'(encode'(T[$\bar{\iota}$])) on the torus is extracted from an RLWE ciphertext approximating the polynomial $X^{-\bar{\iota}} \cdot q(X) \in \mathbb{T}_N[X]$ with $$q(X) = T'[0] + T'[1]X + \ldots + T'[N-1]X^{N-1} = \sum_{j=0}^{N-1} T'[j]X^j$$

in $\mathbb{T}_N[X]$ and where T'[j]=encode'(T[j]), When the image $\mathcal{I}$ of the function f to be evaluated is the real interval $[y_{min}, y_{max})$ and the native space of cleartexts $\mathcal{M}'$ for an LWE-type encryption is the torus $\mathbb{T}$, a possible choice for the encoding function encode' is $$\text{encode}' : \mathcal{I} \to \mathbb{T}, y \mapsto \text{encode}'(y) = \frac{y - y_{min}}{y_{max} - y_{min}}.$$

In this case, the corresponding decoding function is given by y'↦y'($y_{max} - y_{min}$)+$y_{min}$.

Thus, in one of the embodiments of the invention, the approximate homomorphic evaluation of the univariate function f is further characterised in that, when the image of the function f is the real interval $\mathcal{I} = [y_{min}, y_{max})$,
the homomorphic encryption algorithm E' is given by an LWE-type encryption algorithm applied to the torus $\mathbb{T} = \mathbb{R}/\mathbb{Z}$ and has as a native space of the cleartexts $\mathcal{M}' = \mathbb{T}$,
the encoding function encode' is $$\text{encode}' : [y_{min}, y_{max}) \to \mathbb{T}, y \mapsto \text{encode}'(y) = \frac{y - y_{min}}{y_{max} - y_{min}}.$$

The encoding should be taken into account during the addition of the ciphertexts. If we denote encode the encoding function of a homomorphic encoding algorithm E, we then have $E(\mu_1 + \mu_2) = E(\mu_1) + E(\mu_2)$ with $\mu_1$=encode($x_1$) and $\mu_2$=encode($x_2$). If the encoding function is homomorphic, then we actually have $E(\text{encode}(x_1 + x_2)) = E(\text{encode}(x_1)) + E(\text{encode}(x_2))$. Otherwise, if the encoding function does not comply with the addition, a correction ε should be applied on the encoding: ε=encode($x_1 + x_2$)−encode($x_1$)−encode($x_2$)

so that E(encode($x_1+x_2$))=E(encode($x_1$))+E(encode($x_2$))+E($\varepsilon$). In particular, when the encoding is defined by encode:

$$x \mapsto \frac{N-1}{2M} \frac{x - x_{min}}{x_{max} - x_{min}},$$

the correction amounts to $$\varepsilon = \frac{N-1}{2M} \frac{x_{min}}{x_{max} - x_{min}}$$

and is zero for $x_{min}=0$. It should be recalled that for an LWE-type encryption scheme, an uplet in the form $(0, \ldots, 0, \varepsilon)$ is a valid ciphertext of $\varepsilon$. Of course, the previous considerations remain valid on the images. For a homomorphic encryption algorithm E' with an encoding function encode', we have E'(encode'($f(x_1)+f(x_2)$))=E'(encode'($f(x_1)$))+E'(encode'($f(x_2)$))+E'($\varepsilon'$) for a correction $\varepsilon'$ =encode'($f(x_1)+f(x_2)$)−encode'($f(x_1)$)−encode'($f(x_2)$)). In particular, the correction $\varepsilon'$ is zero when the encoding encode' complies with the addition. The correction $\varepsilon'$ amounts to $$\varepsilon' = \frac{y_{min}}{y_{max} - y_{min}}$$

for the encoding $$\text{encode'}: y \mapsto \frac{y - y_{min}}{y_{max} - y_{min}}.$$

Another important particular case is when the same univariate function $f$ should be homomorphically evaluated on inputs $x_1$ and $x_2=x_1+A$ for a given constant A. A typical example of application is the internal function $\Psi$ in Sprecher's application described hereinabove. For a homomorphic encryption algorithm E with an encoding function encode, given the fact that E(encode($x_1$)), it is possible to deduce E(encode($x_2$))=E(encode($x_1+A$)) and then obtain E'(encode'($f(x_1)$)) and E'(encode'($f(x_2)$)) as explained before. However, it is necessary to repeat all the steps. In the particular case where E is an LWE-type algorithm on the torus and that M=2N, at the input E(encode($x_1$)), we have seen that in return of the first substep of the homomorphic evaluation of the table T, we obtain an RLWE-type ciphertext d' of the expected polynomial $X^{-\bar{\imath}_1} \cdot q(X)$ where the polynomial q tabulates the function $f$ and where $\bar{\imath}_1$ has as an expected value $i_1$=discretise(encode($x_1$)) if $x_1$ belongs to the sub-interval $R_{i_1}$. For example, for the discretisation function discretise: $t \mapsto \bar{t} = \lfloor M \times t \rfloor \pmod{M}$ with M=2N, we obtain $$i_2 := \text{discretise (encode } (x_2)) = \text{discretise (encode } (x_1 + A))$$

$$= \text{discretise (encode } (x_1) + \text{encode } (A) + \varepsilon)$$

$$= \lfloor 2N \times (\text{encode } (x_1) + \text{encode } (A) + \varepsilon) \rfloor \bmod 2N$$

$$\approx i_1 + \overline{\mu_A} (\bmod 2N) \text{ with } \overline{\mu_A} := \lfloor 2N \times (\text{encode } (A) + \varepsilon) \rfloor$$

and therefore $X^{-\bar{\imath}_2} \cdot q(X) \approx X^{-\bar{\imath}_1 - \overline{\mu_A}} \cdot q(X) = X^{-\overline{\mu_A}} \cdot (X^{-\bar{\imath}_1} \cdot q(X))$. In this case, an RLWE-type ciphertext of the expected polynomial $X^{-\bar{\imath}_1} \cdot q(X)$ can be obtained more rapidly like $X^{-\overline{\mu_A}} \cdot d'$. A value for E'(encode'($f(x_2)$)⁻) is therefore deduced by the second substep of the homomorphic evaluation of the table T.

The invention also covers an information processing system that is specifically programmed to implement a homomorphic cryptographic evaluation method according to either one of the alternative methods described hereinabove.

Also, it covers the computer program product that is specifically designed to implement either one of the alternative methods described hereinabove and to be loaded and implemented by an information processing system programmed for this purpose.

Application Examples of the Invention

The above-described invention can be very advantageously used to preserve the confidentiality of some data, for example yet not exclusively personal, health, classified information data or more generally all data that its holder wishes to keep secret but on which he would wish that a third-party can perform digital processing. The delocalisation of the processing to one or more third-party service provider(s) is interesting from several reasons: it allows performing operations that otherwise require some costly or unavailable resources; it also allows performing non-public operations. In turn, the third-party responsible for carrying out said digital processing operations might, indeed, wish not to communicate the actual content of the processing and the digital functions implemented thereby.

In such a use, the invention covers the implementation of a remote digital service, such as in particular a cloud computing service in which a third-party service provider responsible for the application of the digital processing on the encrypted data, carries out, on its part, a first pre-calculation step described hereinabove, which consists, for each multivariate function $f_j$ among the functions $f_1, \ldots, f_q$ which will be used to process the encrypted data, in pre-calculating a network of univariate functions. Among all of the resulting univariate functions ($\{g_k(z_{i_k})\}_k$ for a given $z_{i_k}$ with k≥1), the third-party pre-selects in a second step univariate functions $g_k$ and their respective argument $z_{i_k}$ such that there is k'<k meeting one of the three criteria (i) $g_k=g_{k'}$, and $z_{i_k}=z_{i_{k'}}$, (ii) $g_k=g_{k'}$ and $z_{i_k}=z_{i_{k'}}$ or (iii) $g_k=g_{k'}$ and $z_{i_k}=z_{i_{k'}}+a_k$ for a known constant $a_k \neq 0$; these univariate functions will, where appropriate, be evaluated in an optimised manner.

In turn, the holder of the confidential data ($x_1, \ldots, x_p$) carries out the encryption thereof by a homomorphic encryption algorithm E so as to transmit to the third-party type data E($\mu_1$), ..., E($\mu_p$), where $\mu_i$ is the encoded value of $x_i$ by an encoding function. Typically, the choice of the algorithm E is imposed by the third-party provider of the service. Alternatively, the holder of data can use an encryption algorithm of his choice, not necessarily homomorphic, in which case a prior step of re-encryption will be performed by the third-party (or another service provider) to obtain the encrypted data in the desired format.

Thus, in one of the embodiments of the invention, the previously-described homomorphic evaluation cryptographic method(s) is characterised in that the input encrypted data are derived from a prior re-encryption step to be set in the form of ciphertexts of encryptions of said homomorphic encryption algorithm E.

Once the third-party has obtained the encrypted type data $E(\mu_i)$, at the step of homomorphic evaluation of the network of univariate functions, it homomorphically evaluates in a series of successive steps based on these ciphertexts each of the networks of univariate functions, so as to obtain the ciphertexts of encryptions of $f_j$ applied to their inputs (for $1 \leq j \leq q$) under the encryption algorithm E'.

Once it has obtained, for the considered different function(s) $f_j$ the encrypted results of the encryptions on their input values, the concerned third-party sends all these results back to the holder of the confidential data.

The holder of the confidential data can then obtain, based on the corresponding decryption key held thereby, after decoding, a value of the result of one or more function(s) $(f_1, \ldots, f_q)$ starting from homomorphically encrypted input data $(x_1, \ldots, x_p)$, without the third-party having carried out on said data the digital processing consisting in the implementation of one or more function(s), having been able to know the clear content of the data nor, reciprocally, the holder of the data having had to know the detail of the implemented function(s).

Such a sharing of tasks between the holder of the data and the third-party acting as a digital processing service provider can advantageously be carried out remotely, and in particular throughout cloud computing type services without affecting the security of the data and of the concerned processing. Moreover, the different steps of the digital processing may be the responsibility of different service providers.

Thus, in one of the embodiments of the invention, a cloud computing type remote service implements one or more of the previously-described homomorphic evaluation cryptographic methods, wherein the tasks are shared between the holder of the data and the third-part(y/ies) acting as digital processing service providers.

In a particular embodiment of the invention, this remote service involving the holder of the data $x_1, \ldots, x_p$ that he wishes to keep secret and one or more third-part(y/ies) responsible for the application of the digital processing on said data, is further characterised in that 1. the concerned third-part(y/ies) carry out, according to the invention, the first step of pre-calculating networks of univariate functions and the second pre-selection step
2. the holder of the data carries out the encryption of $x_1, \ldots, x_p$ by a homomorphic encryption algorithm E, and transmits to the third-party type data $E(\mu_1), \ldots, E(\mu_p)$, where $\mu_i$ is the encoded value of $x_i$ by an encoding function
3. once the concerned third-party has obtained the encrypted type data $E(\mu_i)$, he homomorphically evaluates in a series of successive steps based on these ciphertexts each of said networks of univariate functions, so as to obtain the ciphertexts of encryptions of $f_j$ applied to their inputs (for $1 \leq j \leq q$) under the encryption algorithm E'
4. once he has obtained, for the considered different function(s) $f_j$ the encrypted results of the encryptions on their input values, the concerned third-party sends all these results back to the holder of the data
5. the holder of the data obtains, based on the corresponding decryption key held thereby, after decoding, a value of the result of one or more function(s) $(f_1, \ldots, f_q)$.

A variant of this embodiment is characterised in that, in the second step (2.) hereinabove:
the holder of the data carries out the encryption of $x_1, \ldots, x_p$ by an encryption algorithm different from E and transmits said data thus encrypted.

on said received encrypted data, the concerned third-party performs a re-encryption to obtain the ciphertexts $E((\mu_1), \ldots, E(\mu_p)$ under said homomorphic encryption algorithm E, where $\mu_i$ is the encoded value of $x_i$ by an encoding function.

Different applications of the remote digital service according to the invention may be mentioned, inter alia. Thus, it is already known, as mentioned in the aforementioned article by MajecSTIC '08, a Kolmogorov-type decomposition applied to grey-level images—which may be viewed as bivariate functions $f(x, y)=I(x, y)$ where $I(x, y)$ gives the grey intensity of the pixel of coordinates (x, y)—allows reconstructing an approximate image of the original image. Consequently, the knowledge of coordinates $(x_1, y_1)$ and $(x_2, y_2)$ defining a bounding box allows performing cropping operations in a simple way. A similar processing applies on colour images while considering the bivariate functions $f_1(x, y)=R(x, y)$, $f_2(x, y)=G(x, y)$ and $f_3(x, y)=B(x, y)$ giving the red, green and blue levels respectively. While this processing type has been known on unencrypted data, the invention now allows carrying out it using homomorphic encryption. Thus, according to the invention, if a user sends in an encrypted manner his GPS coordinates recorded at regular intervals (for example every 10 seconds) during a sport activity as well as the extreme coordinates of his journey (defining a bounding box), the service provider in possession of the image of a cartographic plan will be able to obtain the ciphertext of the portion of the plan relating to the activity by cropping; furthermore, he will be able, still in the encrypted domain, to represent the journey using for example a colour code to indicate the local speed homomorphically computed based on the received encrypted images of the GPS coordinates. Advantageously, the (third-party) service provider has no knowledge of the exact location of the activity (except that it is on his plan) or of the performances of the user. Furthermore, the third-party does not disclose the entirety of the map. The invention can also be advantageously used to allow performing artificial intelligence processing, in particular of machine-learning type on input data which remain encrypted and on which the service provider implementing in particular a neural network applies one or more activation function(s) on values derived from said encrypted data. As example of this use of the invention in connection with the implementation of a neural network, reference may be made to the decomposition of the function $g(z_1, z_2)=\max(z_1, z_2)$, which serves in particular as the aforementioned "max pooling" used by the neural networks into $z_2+(z_1-z_2)^+$ where $z \mapsto z^+$ corresponds to the univariate function $z \mapsto \max(z, 0)$. Reference may also be made to the very popular activation functions ReLU: $\mathbb{R} \to \mathbb{R}^+$, $t \mapsto t^+$ and $$\text{sigmoid: } \mathbb{R} \to [0, 1], t \mapsto \frac{1}{1 + \exp(-t)}.$$

Thus, in one of the embodiments of the invention, a remote service implementing one or more of the previously-described cryptographic homomorphic evaluation methods is intended for digital processing implementing neural networks.

Disclosure of the Invention as it is Characterised

The invention enables the evaluation, on encrypted data, of one or more function(s) through the implementation of the data calculation and processing capabilities of one or more digital information processing system(s). Depending on the case, this or these function(s) may be univariate or multivariate. Hence, in its different variants, the method according to the invention allows proceeding with the evaluation of both types of functions.

When the function(s) to be evaluated are of the multivariate type, the invention provides first of all for carrying out two preliminary steps: the first is a pre-calculation one, followed by a second pre-selection step before applying on the network(s) of univariate functions obtained upon completion of the execution of these two preliminary steps a third step of homomorphic evaluation of said networks of univariate functions according to any known method for homomorphic evaluation of univariate functions. This is the object of claim 1.

Several variants of said method are disclosed in claims 2 to 5, depending on whether the initial pre-calculation step could implement different mathematical techniques described hereinabove: the Kolmogorov-type decomposition of one of its algorithmic variants such as that one proposed by Sprecher (in claim 5), resorting to a sum of particular multivariate functions called ridge functions (in claims 2 and 4) or else through the use of so-called radial functions (in claims 3 and 4). In some particular cases, the invention also provides for the advantageous possibility of using none of these three aforementioned variants but simply proceeding with a formal decomposition using different formal equivalences (such as those claimed in each of claims 6 to 10).

In the case where the function(s) to be evaluated are of the univariate type, the invention provides, in one of its implementations, for the implementation respectively at the input and at the output of two homomorphic encryption algorithms and the step of pre-calculating a table for each considered function followed by a step of homomorphic evaluation of the table thus obtained, as claimed by claim 11. Advantageously, this modality of homomorphic evaluation of one or more univariate function(s) may also be implemented to perform the third homomorphic evaluation step provided for upon completion of the pre-calculation and pre-selection steps which have been applied beforehand to one or more multivariate function(s), according to claim 1.

Claim 11 covers two variants of such a combination, including when the initial pre-calculation phase uses an approximate transformation (as characterised in claims 2 to 5) or a transformation based on a formal equivalence (as characterised in claims 6 to 10).

The invention claimed is:

1. A cryptographic method executed in a digital form by at least one information processing system, the method comprising storing, by a user, encrypted data on a server, enabling a third-party to perform operations on the encrypted data, the operations comprising an evaluation of one or more multivariate real-valued function(s) $f_1, \ldots, f_q$, each of the functions taking as input one or more real-valued variables from among variables $x_1, \ldots, x_p$, and at least one of the one or more multivariate real-valued function(s) $f_1, \ldots, f_q$ taking as input at least two variables, the method comprising: taking as input, from the encrypted data, ciphertexts of encryptions $E(\text{encode}(x_i))$ of each of the inputs $x_i$, with $1 \leq i \leq p$, and returning a plurality of ciphertexts of encryptions of the one or more multivariate real-valued functions $f_1, \ldots, f_q$ applied at their respective inputs, where E is a homomorphic encryption algorithm and encode is an encoding function which associates to each of the variables $x_i$ an element of a native space of cleartexts of E, wherein the method further comprises:
   a. a pre-calculation step comprising transforming the one or more multivariate real-valued function(s) $f_1, \ldots, f_q$ into a network of real-valued univariate functions, the network comprising sums and compositions of univariate functions,
   b. a pre-selection step comprising identifying in the network of univariate functions redundancies of any one of three types:
      same univariate functions applied to a same argument,
      different univariate functions applied to a same argument,
      same univariate functions applied to arguments differing by a non-zero additive constant,
   c. a step of homomorphic evaluation of the network of univariate functions, wherein at least part of the univariate functions in the network is reused an evaluated in a shared manner according to the redundancies selected in the pre-selection step.

2. The cryptographic method according to claim 1, wherein for at least one function $f_j$ from among the one or more multivariate real-valued function(s) $f_1, \ldots, f_q$, the transforming of the pre-calculation step is an approximate transformation in the form $$f_j(x_{j_1}, \ldots, x_{j_t}) \approx \sum_{k=0}^{K} g_k\left(\sum_{i=1}^{t} a_{i,k} x_{j_i}\right)$$

with $t \leq p$ and $j_1, \ldots, j_t \in \{1, \ldots, p\}$, and where the coefficients $a_{i,k}$ are real numbers and where the g are univariate functions defined on reals and with real value, said functions g and said coefficients $a_{i,k}$ being determined as a function of $f_j$, for a given parameter K.

3. The cryptographic method according to claim 1, wherein for at least one function $f_j$ from among the one or more multivariate real-valued function(s) $f_1, \ldots, f_q$, the transforming of the pre-calculation step is an approximate transformation in the form $$f_j(x_{j_1}, \ldots, x_{j_t}) \approx \sum_{k=0}^{K} g_k(\|x - a_k\|)$$

with $x = (x_{j_1}, \ldots, x_{j_t})$, $a_k = (a_{1,k}, \ldots, a_{t,k})$, $t \leq p$ and $j_1, \ldots, j_t \in \{1, \ldots, p\}$, and where the vectors $a_k$ have as coefficients $a_{i,k}$ real numbers and where the $g_k$ are univariate functions defined on reals and with real value, said functions $g_k$ and said coefficients $a_{i,k}$ being determined as a function of $f_j$, for a given parameter K and a given norm $\|\cdot\|$.

4. The cryptographic method according to claim 2, wherein the coefficients $a_{i,k}$ are fixed.

5. The cryptographic method according to claim 1, wherein for at least one function $f_j$ from among the one or more multivariate real-valued function(s) $f_1, \ldots, f_q$, the transforming of the pre-calculation step is an approximate transformation in the form $$f_j(x_{j_1}, \ldots, x_{j_t}) \approx \sum_{k=0}^{K} g_k\left(\sum_{i=1}^{t} \lambda_{j_i} \Psi(x_{j_i} + ka)\right)$$

with $t \leq p$ and $j_1, \ldots, j_t \in \{1, \ldots, p\}$, and where $\Psi$ is a univariate function defined on reals and with real value, where the $\lambda_{j_i}$ are real constants and where the g are univariate functions defined on reals and with real value, the functions $g_k$ being determined as a function of $f_1$, for a given parameter K.

6. The cryptographic method according to claim 1, wherein the transforming of the pre-calculation step uses a formal equivalence $\max(z_1, z_2) = z_2 + (z_1 - z_2)^+$ to express a function $(z_1, z_2) \mapsto \max(z_1, z_2)$ as a combination of sums and compositions of univariate functions.

7. The cryptographic method according to claim 1, wherein the transforming of the pre-calculation step uses a formal equivalence $\min(z_1, z_2) = z_2 + (z_1 - z_2)^-$ to express a function $(z_1, z_2) \mapsto \min(z_1, z_2)$ as a combination of sums and compositions of univariate functions.

8. The cryptographic method according to claim 1, wherein the transforming of the pre-calculation step uses a formal equivalence $z_1 \times z_2 = (z_1 + z_2)^2/4 - (z_1 - z_2)^2/4$ to express a function $(z_1, z_2) \mapsto z_1 \times z_2$ as a combination of sums and compositions of univariate functions.

9. The cryptographic method according to claim 1, wherein the transforming of the pre-calculation step uses a formal equivalence $|z_1 \times z_2| = \exp(\ln|z_1| + \ln|z_2|)$ to express a function $(z_1, z_2) \mapsto |z_1 \times z_2|$ as a combination of sums and compositions of univariate functions.

10. The cryptographic method according to claim 6, wherein the function includes three variables or more, and the formal equivalence is obtained from an iteration of the formal equivalence for two variables.

11. The cryptographic method according to claim 1, including in the step of homomorphic evaluation of the network of univariate functions, a sub-process for approximate homomorphic evaluation of at least one univariate function $f$ of a real-valued variable x of the functions in the network with an arbitrary accuracy in a domain of definition $\mathcal{D}$ and with a real value in an image $\mathcal{I}$, , taking as input a ciphertext of an encryption of x, E(encode(x)), and returning a ciphertext of an encryption of an approximate value of $f(x)$, E'(encode'(y)) with $y \approx f(x)$, where E and E' are homomorphic encryption algorithms a respective native space of cleartexts of which is $\mathcal{M}$ and $\mathcal{M}'$, said sub-method being parameterised by:
an integer $N \geq 1$ quantifying an actual accuracy of the representation of the variables at the input of the function $f$ to be evaluated,
an encoding function encode taking as input an element of the domain $\mathcal{D}$ and associating thereto an element of $\mathcal{M}$,
an encoding function encode' taking as input an element of the image $\mathcal{I}$ and associating thereto an element of $\mathcal{M}'$,
a discretisation function discretise taking as input an element of $\mathcal{M}$ and associating thereto an index represented by an integer,
a homomorphic encryption scheme having an encryption algorithm $\mathcal{E}_H$, a native space of the cleartexts of which $\mathcal{M}_H$ has a cardinality of at least N,
an encoding function encode$_H$ taking as input an integer and returning an element of $\mathcal{M}_H$,
so that the image of the domain $\mathcal{D}$ the encoding encode followed by the discretisation discretise (discretise∘encode)($\mathcal{D}$), is a set of at most N indices selected from $\mathcal{S} = \{0, \ldots, N-1\}$,
the method further comprising:
a. a step of pre-calculating a table corresponding to said univariate function $f$, comprising
decomposing the domain $\mathcal{D}$ into N selected sub-intervals $R_0, \ldots, R_{N-1}$ whose union makes up $\mathcal{D}$ for each index i in $\mathcal{S} = \{0, \ldots, N-1\}$, determining a representative x(i) in the sub-interval $R_i$ and calculating the value $y(i) = f(x(i))$
returning the table T consisting of the N components T[0], ..., T[N-1], with T[i]=y(i) for $0 \leq i \leq N-1$ b. a step of homomorphic evaluation of the table comprising
converting the ciphertext E(encode(x)) into the ciphertext $\mathcal{E}_H(\text{encode}_H(\tilde{i}))$ for an integer $\tilde{i}$ having as an expected value the index i=(discretise∘encode)(x) in the set $\mathcal{S} = \{0, \ldots, N-1\}$ if $x \in R_i$
obtaining the ciphertext $E'(\text{encode}'(T[\tilde{i}])^-)$ for an element $\text{encode}'(T[\tilde{i}])^-$ having as an expected value $\text{encode}(T[\tilde{i}])$, based on the ciphertext $\mathcal{E}_H(\text{encode}_H(\tilde{i}))$ and the table T
returning $E'(\text{encode}'(T[\tilde{i}])^-)$.

12. The cryptographic method according to claim 11, wherein
a domain of definition of the function $f$ to be evaluated is given by the real interval $\mathcal{D} = [x_{min}, x_{max})$,
N intervals $R_i$ (for $0 \leq i \leq N-1$) covering the domain $\mathcal{D}$ are the semi-open sub-intervals $$R_i = \left[\frac{i}{N}(x_{max} - x_{min}) + x_{min}, \frac{i+1}{N}(x_{max} - x_{min}) + x_{min}\right),$$

splitting $\mathcal{D}$ in a regular manner.

13. The cryptographic method according to claim 11, wherein the set $\mathcal{S}$ is a subset of the additive group $\mathbb{Z}_M$ for an integer $M \geq N$.

14. The cryptographic method according to claim 13, wherein the group $\mathbb{Z}_M$ is represented in a multiplicative manner as powers of a M-th primitive root of the unit denoted X, so that to the element i of $\mathbb{Z}$ M is associated the element $X^i$; all of the M-th roots of the unit $\{1, X, \ldots, X^{M-1}\}$ forming a group isomorphic with $\mathbb{Z}_M$ for the multiplication modulo $(X^M - 1)$.

15. The cryptographic method according to claim 11, wherein the homomorphic encryption algorithm E is given by an LWE-type encryption algorithm applied to the torus $\mathbb{T} = \mathbb{R}/\mathbb{Z}$ and has as a native space of the cleartexts $\mathcal{M} = \mathbb{T}$.

16. The cryptographic method according to claim 15, parameterised by an integer $M \geq N$ wherein
the encoding function encode has its image contained in the sub-interval $$\left[0, \frac{N}{M} - \frac{1}{2M}\right)$$

of the torus, and
the discretisation function discretise applies an element t of the torus to the rounded integer of the product M×t modulo M, where M×t is calculated in $\mathbb{R}$; in mathematical form:

discretise: $\mathbb{T} \to \mathbb{Z}$, $t \mapsto \text{discretise}(t) = \lceil M \times t \rfloor \mod M$.

17. The cryptographic method according to claim 16, wherein the domain of definition of the function $f$ is the real interval $\mathcal{D} = [x_{min}, x_{max})$, and the encoding function encode is $$\text{encode: } [x_{min}, x_{max}) \to \left[0, \frac{N}{M} - \frac{1}{2M}\right),$$

$$x \mapsto \text{encode}(x) = \frac{2N-1}{2M} \cdot \frac{x - x_{min}}{x_{max} - x_{min}}.$$

18. The cryptographic method according to claim 15, wherein the homomorphic encryption algorithm $\mathcal{E}_H$ is an LWE-type encryption algorithm and the encoding function $\text{encode}_H$ is the identity function.

19. The cryptographic method according to claim 15, parameterised by an even integer M and wherein the homomorphic encryption algorithm $\mathcal{E}_H$ is an RLWE-type encryption algorithm and the encoding function $\text{encode}_H$ is the function $\text{encode}_H: \mathbb{Z}_M \to \mathbb{T}_{M/2}[X]$, $i \mapsto \text{encode}_H(i) = X^{-i} \cdot p(X)$ for an arbitrary polynomial p of $\mathbb{T}_{M/2}[X]$.

20. The cryptographic method according to claim 18, parameterised by an even integer M equal to 2N, and wherein an LWE-type ciphertext $E'(\text{encode}'(T[\tilde{i}]))$ on the torus is extracted from an RLWE ciphertext approaching the polynomial $X^{-\tilde{i}} \cdot q(X) \in \mathbb{T}_N[X]$, with $$q(X) = T'[0] + T'[1]X + \ldots + T'[N-1]X^{N-1} = \sum_{j=0}^{N-1} T'[j]X^j$$

in $\mathbb{T}_N[X]$ and where $T'[j] = \text{encode}'(T[j])$, $0 \leq j \leq N-1$.

21. The cryptographic method according to claim 11, wherein the image of said at least one function $f$ is the real interval $\mathcal{J} = [y_{min}, y_{max}]$, and
the homomorphic encryption algorithm E' is given by an LWE-type encryption algorithm applied to the torus $\mathbb{T} = \mathbb{R}/\mathbb{Z}$ and has as a native space of the cleartexts $\mathcal{M}' = \mathbb{T}$,,
the encoding function encode' is $$\text{encode}': \left[y_{min}, y_{max} \to \mathbb{T}, y \mapsto \text{encode}'(y) = \frac{y - y_{min}}{y_{max} - y_{min}}\right].$$

22. The cryptographic method according to claim 1, wherein the input encrypted data are derived from a prior re-encryption step so as to be set in the form of ciphertexts of encryptions of said homomorphic encryption algorithm E.

23. An information processing system comprising a hardware processor programmed to implement a homomorphic evaluation cryptographic method, the method comprising storing, by a user, encrypted data on a server, enabling a third-party to perform operations on the encrypted data, the operations comprising an evaluation of one or more multivariate real-valued function(s) $f_1, \ldots, f_q$, each of the functions taking as input one or more real-valued variables from among variables $x_1, \ldots, x_p$, and at least one of the one or more multivariate real-valued function(s) $f_1, \ldots, f_q$ taking as input at least two variables, the method comprising
taking as input, from the encrypted data, ciphertexts of encryptions $E(\text{encode}(x_i))$ of each of the inputs $x_i$, with $1 \leq i \leq p$, and returning a plurality of ciphertexts of encryptions of the one or more multivariate real-valued functions $f_1, \ldots, f_q$ applied at their respective inputs, where E is a homomorphic encryption algorithm and encode is an encoding function which associates to each of the variables $x_i$ an element of a native space of cleartexts of E, wherein the method further comprises:
a. a pre-calculation step comprising transforming the one of more multivariate real-valued function(s) $f_1, \ldots, f_q$ into a network of real-valued univariate functions, the network comprising sums and compositions of the univariate functions,
b. a pre-selection step comprising identifying in the network of univariate functions redundancies of any one of three types:
same univariate functions applied to a same argument,
different univariate functions applied to a same argument,
same univariate functions applied to arguments differing by a non-zero additive constant,
c. a step of homomorphic evaluation of the network of univariate functions, wherein at least part of the univariate functions in the network is reused and evaluated in a shared manner according to the redundancies selected in the pre-selection step.

24. Non-transient computer media configured to be loaded and implemented by an information processing system, the non-transient computer media implementing a homomorphic evaluation cryptographic method, the method comprising storing, by a user, encrypted data on a server, enabling a third-party to perform operations on the encrypted data, the operations comprising an evaluation of one or more multivariate real-valued function(s) $f_1, \ldots, f_q$, each of the functions taking as input one or more real-valued variables from among variables $x_1, \ldots, x_p$, and at least one of the one or more multivariate real-valued function(s) $f_1, \ldots, f_q$ taking as input, from the encrypted data, at least two variables, the method comprising
taking as input ciphertexts of encryptions $E(\text{encode}(x_i))$ of each of the inputs $x_i$, with $1 \leq i \leq p$, and returning a plurality of ciphertexts of encryptions of the one or more multivariate real-valued functions $f_1, \ldots, f_q$ applied at their respective inputs, where E is a homomorphic encryption algorithm and encode is an encoding function which associates to each of the variables x, an element of a native space of cleartexts of E,
wherein the method further comprises:
a. a pre-calculation step comprising transforming the one of more multivariate real-valued function(s) $f_1, \ldots, f_q$ into a network of real-valued univariate functions, the network comprising sums and compositions of the univariate functions,
b. a pre-selection step comprising identifying in the network of univariate functions redundancies of any one of three types:
same univariate functions applied to a same argument,
different univariate functions applied to a same argument,
same univariate functions applied to arguments differing by a non-zero additive constant,
c. a step of homomorphic evaluation of the network of univariate functions, wherein at least part of the univariate functions in the network is reused and evaluated in a shared manner according to the redundancies selected in the pre-selection step.

25. A cloud computer type remote service wherein tasks are shared between a data holder and one or more third-parties implemented as digital processing systems, the remote service comprising a hardware processor programmed to implement a homomorphic evaluation cryptographic method, the method comprising storing, by a user, encrypted data on a server, enabling a third-party to perform operations on the encrypted data, the operations comprising an evaluation of one or more multivariate real-valued function(s) $f_1, \ldots, f_q$, each of the functions taking as input one or more real-valued variables from among variables $x_1, \ldots, x_p$, and at least one of the one or more multivariate real-valued function(s) $f_1, \ldots, f_q$ taking as input, from the encrypted data, at least two variables, the method comprising taking as input ciphertexts of encryptions E(encode($x_i$)) of each of the inputs $x_i$, with 1≤i≤p, and returning a plurality of ciphertexts of encryptions of the one or more multivariate real-valued functions $f_1, \ldots, f_q$ applied at their respective inputs, where E is a homomorphic encryption algorithm and encode is an encoding function which associates to each of the variables x, an element of a native space of cleartexts of E, wherein the method further comprises:
  a. a pre-calculation step comprising transforming the one of more multivariate real-valued function(s) $f_1, \ldots, f_q$ into a network of real-valued univariate functions, the network comprising sums and compositions of the univariate functions,
  b. a pre-selection step comprising identifying in the network of univariate functions redundancies of any one of three types:
    same univariate functions applied to a same argument,
    different univariate functions applied to a same argument,
    same univariate functions applied to arguments differing by a non-zero additive constant,
  c. a step of homomorphic evaluation of the network of univariate functions, wherein at least part of the univariate functions in the network is reused and evaluated in a shared manner according to the redundancies selected in the pre-selection step.

26. The remote service according to claim 25 involving the holder of the data $x_1, \ldots, x_p$ who wishes to keep the data secret and one or more third-parties responsible for the application of the digital processing on said data, wherein
  a. the concerned third-part(y/ies) carry out, the first step of pre-calculating networks of univariate functions and the second pre-selection step
  b. starting from the data $x_1, \ldots, x_p$ held by the holder of the data are calculated type data E($\mu_1$), ..., E($\mu_p$), where E is a homomorphic encryption algorithm and where $\mu_i$ is the encoded value of $x_i$ by an encoding function
  c. once the concerned third-party has obtained the encrypted type data E($\mu_i$), he homomorphically evaluates in a series of successive steps based on these ciphertexts each of said networks of univariate functions, so as to obtain the ciphertexts of encryptions of $f_j$ applied to their inputs (for 1≤j≤q) under the encryption algorithm
  d. once he has obtained, for the considered different function(s) $f_j$ the encrypted results of the encryptions on their input values, the concerned third-party sends all these results back to the holder of the data
  e. the holder of the data obtains, based on the corresponding decryption key held thereby, after decoding, a value of the result of one or more function(s) ($f_1, \ldots, f_q$).

27. The remote service according to claim 26, wherein in the second step denoted (b) in said claim, the holder of the data carries out the encryption of $x_1, \ldots, x_p$ by a homomorphic encryption algorithm E, and transmits type data E($\mu_1$), ..., E($\mu_p$) to the third-party, where $\mu_i$ is the encoded value of $x_i$ by an encoding function.

28. The remote service according to claim 26, wherein in the second step denoted (b) in said claim
  the holder of the data carries out the encryption of $x_1, \ldots, x_p$ by an encryption algorithm different from E and transmits said data thus encrypted,
  on said received encrypted data, the concerned third-party performs a re-encryption to obtain the ciphertexts E($\mu_1$), ..., E($\mu_p$) under said homomorphic encryption algorithm E, where $\mu_i$ is the encoded value of $x_i$ by an encoding function.

29. The remote service according to claim 25 intended for digital processing implementing neural networks.

30. The cryptographic method according to claim 1, wherein the encrypted data is encrypted before storing the encrypted data on the server.

31. The cryptographic method according to claim 1, wherein the plurality of ciphertexts of encryptions of the one or more multivariate real-valued functions $f_1, \ldots, f_q$ are returned to the user.

* * * * *